(12) United States Patent
Katsuda et al.

(10) Patent No.: US 7,290,796 B2
(45) Date of Patent: *Nov. 6, 2007

(54) INFLATOR

(75) Inventors: Nobuyuki Katsuda, Hyogo (JP);
Masayuki Nakayasu, Hyogo (JP);
Naoki Matsuda, Hyogo (JP); Yuzo Goto, Hyogo (JP)

(73) Assignee: Daicel Chemical Industries, Ltd., Sakai-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/050,778

(22) Filed: Feb. 7, 2005

(65) Prior Publication Data

US 2005/0242556 A1    Nov. 3, 2005

Related U.S. Application Data

(62) Division of application No. 10/204,903, filed as application No. PCT/JP01/11574 on Aug. 26, 2002, now Pat. No. 6,959,649.

(30) Foreign Application Priority Data

| Dec. 27, 2000 | (JP) | ............................. 2000-396734 |
| Dec. 27, 2000 | (JP) | ............................. 2000-396735 |
| Dec. 27, 2000 | (JP) | ............................. 2000-396736 |
| Dec. 27, 2000 | (JP) | ............................. 2000-396737 |
| Apr. 9, 2001 | (JP) | ............................. 2001-109472 |
| Apr. 9, 2001 | (JP) | ............................. 2001-109483 |
| Apr. 9, 2001 | (JP) | ............................. 2001-109484 |
| Apr. 9, 2001 | (JP) | ............................. 2001-109485 |
| Jun. 12, 2001 | (JP) | ............................. 2001-177616 |
| Jul. 23, 2001 | (JP) | ............................. 2001-221831 |
| Dec. 17, 2001 | (JP) | ............................. 2001-382988 |

(51) Int. Cl.
*B60R 21/26* (2006.01)

(52) U.S. Cl. ..................... 280/737; 102/530

(58) Field of Classification Search ............... 280/736, 280/740, 741, 742, 737; 102/530, 531
See application file for complete search history.

(56) References Cited

U.S. PATENT DOCUMENTS 3,680,886 A    8/1972    Mazelsky (Continued)

FOREIGN PATENT DOCUMENTS

DE    196 12 166 A1    10/1997

(Continued)

*Primary Examiner*—Paul N. Dickson
*Assistant Examiner*—Tiffany L. Webb
(74) *Attorney, Agent, or Firm*—Birch, Stewart, Kolasch & Birch, LLP

(57) ABSTRACT

Inflator with improved reliability wherein charge holder 37 that gives directivity to a detonation wave generated due to combustion of priming 36 is provided to igniter 26, thereby promoting rupture of plate 19. Diffuser portion 320 is connected in the opening portion side of housing 312, and gas discharging port 340 is connected to diffuser portion 320. Diffuser portion 520 is connected in the opening portion side of inflator housing 512, and gas discharging port 540 is connected to diffuser portion 520. Outflow directions of the pressurized media within each gas discharging port 340, 540 and each respective axial direction of inflator housings 312, 512 are coincident with each other at actuation.

15 Claims, 17 Drawing Sheets

U.S. PATENT DOCUMENTS

| | | | |
|---|---|---|---|
| 4,891,189 A | | 1/1990 | Harwood, Jr. |
| 5,076,607 A | | 12/1991 | Woods et al. |
| 5,131,680 A | * | 7/1992 | Coultas et al. ............... 280/737 |
| 5,226,667 A | * | 7/1993 | Coultas ....................... 280/734 |
| 5,462,307 A | * | 10/1995 | Webber et al. ............... 280/737 |
| 5,496,062 A | | 3/1996 | Rink et al. |
| 5,527,066 A | | 6/1996 | Svensson |
| 5,542,702 A | | 8/1996 | Green et al. |
| 5,564,740 A | * | 10/1996 | Zakula ....................... 280/737 |
| 5,580,085 A | * | 12/1996 | Cuevas et al. ............... 280/737 |
| 5,602,361 A | * | 2/1997 | Hamilton et al. ............ 102/288 |
| 5,720,495 A | | 2/1998 | Faigle et al. |
| 5,743,557 A | * | 4/1998 | Butt ........................... 280/737 |
| 5,782,486 A | * | 7/1998 | Barnes et al. ................ 280/737 |
| 5,799,969 A | * | 9/1998 | Coleman et al. ........... 280/728.2 |
| 5,803,493 A | | 9/1998 | Paxton et al. |
| 5,882,036 A | * | 3/1999 | Moore et al. ................ 280/736 |
| 6,029,995 A | | 2/2000 | Fink |
| 6,042,146 A | | 3/2000 | Bauer et al. |
| 6,099,033 A | | 8/2000 | Jenkins |
| 6,120,058 A | * | 9/2000 | Mangum et al. ............. 280/741 |
| 6,158,769 A | | 12/2000 | Swann et al. |
| 6,572,141 B2 | | 6/2003 | Nanbu |
| 6,764,097 B2 | | 7/2004 | Kelley et al. |

FOREIGN PATENT DOCUMENTS

| | | |
|---|---|---|
| DE | 297 14 518 U1 | 11/1997 |
| DE | 197 31 218 A1 | 1/1999 |
| DE | 20003004 U1 * | 6/2000 |
| DE | 100 02 083 A1 | 11/2000 |
| GB | 1 351 335 A | 4/1974 |
| JP | 47-36288 B1 | 9/1972 |
| JP | 49-36735 Y1 | 10/1974 |
| JP | 54-4766 Y2 | 2/1979 |
| JP | 57-29440 B2 | 6/1982 |
| JP | 57-39183 B2 | 8/1982 |
| JP | 6-503288 A | 4/1994 |
| JP | 3028182 U | 6/1996 |
| JP | 3031246 U | 9/1996 |
| JP | 10-230814 A | 9/1998 |
| JP | 11-048900 A | 2/1999 |
| JP | 11-189122 A | 7/1999 |
| JP | 11-512048 A | 10/1999 |
| JP | 11-334525 A | 12/1999 |
| JP | 2000-225913 A | 8/2000 |
| JP | 2001-71857 A | 3/2001 |
| JP | 2002-172995 A | 6/2002 |

* cited by examiner

INFLATOR

This application is a Divisional of application Ser. No. 10/204,903 filed on Aug. 26, 2002 and for which priority is claimed under 35 U.S.C. § 120. Application Ser. No. 10/204,903 is now U.S. Pat. No. 6,959,649 B2. It was originally the national phase of PCT International Application No. PCT/JP01/11574 filed on Dec. 27, 2001 under 35 U.S.C. § 371. The entire contents of each of the above-identified applications are hereby incorporated by reference. This application also claims priority under 35 U.S.C. § 119 of Application No. 2000-396734, 2000-396735, 2000-396736, 2000-396737, 2001-109472, 2001-109483, 2001-109484, 2001-109485, 2001-177616, 2001-221831 and 2001-382988 filed in Japan on Dec. 27, 2001, Dec. 27, 2000, Dec. 27, 2000, Dec. 27, 2000, Apr. 9, 2001, Apr. 9, 2001, Apr. 9, 2001, Apr. 9, 2001, Jun. 12, 2001, Jul. 23, 2001 and Dec. 17, 2001, respectively.

TECHNICAL FIELD WHERE THE INVENTION BELONGS

The present invention relates to an inflator mounted in various kinds of vehicles for protecting a passenger when the vehicle received the impact mainly from the sides, and an air bag apparatus using the same. The present invention also relates to filter means therefor, and an inflator and an air bag apparatus using the same.

BACKGROUND ART

As an inflator for an inflating type safety system of an automobile, in order to optimally protect a passenger in accordance with a position of a seat in a vehicle such as a driver side, a passenger side and the like, there are known various inflators such as an air bag inflator for a driver side, an air bag inflator for a passenger side, an air bag inflator for a side collision, an inflator for a curtain air bag, an inflator for a knee-bolster, an inflator for an inflatable seat belt, an inflator for a tubular system and an inflator for pretensioner. Among these inflators, the inflator for a curtain air bag inflates and develops an air bag instantaneously to form a curtain having a thickness of some centimeters over windows of a vehicle when the vehicle received the impact from the sides.

Such an inflator for a curtain air bag is structured such that discharge of pressurized medium starts by rupture of a rupturable plate and a curtain air bag is inflated and developed finally. Since so-called enhancer agent (a transfer charge) is not used, it is important to increase the rupturability of the rupturable plate in order to improve reliability in the operation of the inflator.

Not only the above inflator for a curtain air bag but also various inflators are required to be reduced in weight according to the requirement for weight reduction of a vehicle itself and simultaneously they are also required to be enhanced safety in actuation thereof. For example, when the inflator for a curtain air bag is actuated to inflate and develop the curtain air bag, a passenger views the curtain air bag and comes in contact therewith. Therefore, if foreign objects are inserted in the air bag, the passenger can be uneasy or alarmed or the air bag can be damaged. Accordingly, in a case that the inflator is provided as a product, it becomes important to eliminate such a problem.

In order to reduce size and weight, a manufacturing process of an inflator needs to be simplified because of a demand for reduction in the number of parts or manufacturing cost.

As related conventional techniques, a device for inflating a flexible container using helium and hydrogen is disclosed in U.S. Pat. No. 5,527,066. A gas flow device for an air bag using a pressurized inert gas is disclosed in U.S. Pat. No. 5,782,486. An air bag apparatus for inflating an air bag with nitrogen or helium is disclosed in U.S. Pat. No. 3,680,886. A side-collision inflator housing for an air bag using a pressurized gas and a gas generating agent is disclosed in U.S. Pat. No. 5,803,493. A pressurized gas inflator using argon or nitrogen as a pressurized gas is disclosed in JP-U No. 3031246.

DISCLOSURE OF INVENTION

An object of the present invention is to provide an inflator in which reduction in size and weight is realized and reliability in operation is improved, and to provide an air bag apparatus using the same.

The inflator of the present invention can be applied to any one of an inflator for a curtain air bag, a side-collision inflator. The following is described in the case of the present invention applied to the inflator for a curtain air bag.

The present invention (I) relates to a structure and method in which an outflow path of a pressurized medium is closed with a rupturable plate and the rupturable plate is ruptured, and it includes aspects (I-1), (I-2) and (I-3). The present invention (II) relates to a structure and method for controlling outflow of the pressurized medium. The present invention (III) relates to filter means and an inflator using the same. Also, the present invention relates to an air bag apparatus mounted with the inflator. The respective aspects will be explained below.

(I-1)

As a means for solving the above problem, the present invention provides an inflator comprising an inflator housing in which a pressurized medium is charged and one end is provided with an opening portion, a diffuser portion which is connected to the opening portion of the inflator housing and is provided with a gas discharging port for discharging the pressurized medium flowing from the opening to the outside at actuation, a rupturable plate closing an outflow path for the pressurized medium between the diffuser portion and the opening portion of the inflator housing, and an igniter which includes a priming for rupturing the rupturable plate by an detonation wave and is provided in the diffuser portion, wherein one or combination of at least two requirements selected from the following requirements (a) to (d) are provided:

(a) the igniter has a charge holder for giving directivity to detonation waves generated due to combustion of the priming.
(b) the igniter has a cup arranged to include at least a priming therein and the cup has a fragile portion in a portion facing the rupturable plate.
(c) an explosive is attached on the surface of the rupturable plate.
(d) the rupturable plate has a fragile portion.

In the requirement (a), the charge holder is arranged to surround at least a priming of the igniter from the outside and a side thereof facing the rupturable plate can be open.

By providing the charge holder in this manner to give the directivity to the detonation wave (flame) generated due to combustion of the priming, in other words, to direct the detonation wave towards the rupturable plate, the rupturable plate can be ruptured more unfailingly so that the reliability in operation can be enhanced.

In the requirement (b), the fragile portion in the cup can be formed by providing a notch or a thinner part on the portion facing the rupturable plate. Also, the fragile portion in the cup may be provided on either of an outer surface or an inner surface of a portion facing the rupturable plate.

Further in the requirement (b), the fragile portion in the cup may be formed by providing one line notch or providing two or more line notches crossing perpendicularly to each other or crossing obliquely thereto on a portion facing the rupturable plate, or by making the portion thinner in a circular shape or a shape similar thereto. Here, the two line notches being perpendicular to each other are a cross-shaped notch, and the two or more line notches crossing obliquely are a X-like shaped notch, a Y-like shaped notch or the like.

As described above, by providing the portion of the igniter cup facing the rupturable plate with the fragile portion, the cup is ruptured at the fragile portion when the igniter is activated to ignite and burn the priming. Therefore, an detonation wave (flame) which has passed through a ruptured portion advances straightly in a narrow width towards the rupturable plate so that the rupturable plate can be ruptured more securely, thereby improving the reliability in operation.

In the requirement (c), such a structure can be employed that an explosive can be attached to the rupturable plate in the side facing the igniter.

If an explosive is attached to the rupturable plate in this manner, an detonation wave reaches the rupturable plate to heat the rupturable plate so that the rupturable plate can be ruptured more securely by an action of the explosive ignited and burnt by the heat, and consequently, the reliability in operation can be improved.

In the requirement (d), such a structure can be employed that the fragile portion can be formed by partially notching or by making a thinner portion. This fragile portion may be provided on either of the surfaces of the rupturable plate.

Further in the requirement (d), the fragile portion can be formed by providing two or more line notches being partially perpendicular or oblique to each other, or making a thinner portion in a circular shape or a shape similar thereto. Here, the two line notches crossing perpendicular to each other are a cross-shaped notch, and the two or more line notches crossing obliquely are a X-like shaped notch, a Y-like shaped notch or the like.

By providing the rupturable plate with the fragile portion in this manner, the rupturable plate is ruptured at the fragile portion when the igniter is actuated to ignite and burn the priming. Therefore, the rupturable plate can be ruptured more securely, thereby improving the reliability in operation.

In the inflator of the present invention, such a structure including one requirement selected from the above requirements (a) to (d), a combination of two requirements, a combination of three requirements or a combination of four requirements can be employed, but it is preferable that a structure includes the requirements (a) and (b).

In the inflator of the present invention, such a structure can be employed that the igniter and the rupturable plate are disposed to face each other at a predetermined interval, for example, an interval of about 5 mm or less. Here the predetermined interval means an interval which is long enough not to disturb outflow of the pressurized medium since outflow of the pressurized medium may be disturbed in case of too close arrangement of the rupturable plate and the igniter.

In the inflator of the present invention, the rupturable plate can be in a bowl-like shape projecting towards the igniter.

In each of the above inventions, the rupturable plate may be mounted to the opening portion of the inflator housing or the diffuser portion.

(I-2)

The present invention has solved such a problem as improvement in safety at a time of actuation by providing one of three requirements (a) to (c), a combination of the requirements (a) and (b), a combination of the requirements (a) and (c), a combination of the requirements (b) and (c), or a combination of all the three requirements.

That is, the present invention provides as the solving means of the above problem, provides an inflator comprising an inflator housing in which a pressurized medium is charged and one end is provided with an opening, a diffuser portion which is connected to the opening portion of the inflator housing and is provided with a gas discharging hole for discharging the pressurized medium flowing from the opening portion to the outside at actuation, the rupturable plate closing outflow path for the pressurized medium between the opening of the inflator housing and the diffuser portion, and an igniter which includes a priming for rupturing the rupturable plate by an detonation wave and is provided in the diffuser portion, wherein one or combination of at least two requirements selected from the following requirements (a) to (d) are provided:

(a) the rupturable plate has a notch.
(b) a filter is arranged at the gas discharging hole.
(c) a chemical agent containing perchlorate as a main component in an amount of 280 mg or less is used as a priming for rupturing the rupturable plate.

In the requirement (a), the notch provided on the rupturable plate acts such that the rupturable plate is ruptured from the portion provided with the notch when the rupturable plate receives a pressure due to an detonation wave (flame) and acts such that any fragment are not made.

In order to achieve such actions, it is preferable that the rupturable plate has two or more line notches crossing perpendicularly to each other or obliquely, and these notches on the rupturable plate are formed in a cross shape, a X-like shape, a Y-like shape or the like. For example, in case of the rupturable plate having the cross-shaped notch or the X-like shaped notch, the rupturable plate imparted with a rupturing pressure laps at four portions in the crossing portion of the notches to open, so that the pressurized medium starts being discharged and fragments are not made.

In the requirement (b), the filter can be arranged inside or outside the gas discharging hole, and the gas discharging hole can also be formed with a filter.

In the requirement (b), such a structure can be employed that a gas discharging port connected at the gas discharging hole is further provided, and the pressurized medium flowing out from the gas discharging hole flows out from an opening portion of the gas discharging port via the gas discharging port, and the filter is arranged in the gas discharging port.

Further in the requirement (b), such a structure may be employed that the filter is disposed in the opening portion of the gas discharging port.

With such an arrangement of a filter, if any fragments are made from the rupturable plate or combustion residue (oxide) of the priming are generated, the fragments and part of the combustion residue are removed from the flowing pressurized medium, so that the fragments and residue can be prevented from flowing into the air bag. Thereby, it is possible to prevent that passenger is uneasy or alarmed and that the air bag is damaged. Also, by disposing the filter outside the gas discharging hole, a pressure applying to the filter can be reduced as compared with a case of the filter disposed inside, thereby suppressing damage to the filter.

In the requirement (c), it is preferable that the chemical agent containing perchlorate as a main component and used as a priming is a chemical agent containing zirconium/potassium perchlorate as a main component, and it is preferable that the rupturable plate is a nickel base alloy with corrosion-resistance and with a thickness of 0.8 mm or less.

By associating the strength of the rupturable plate with the pressure of the detonation wave for rupturing the rupturable plate, namely, the kind and amount of the priming, the rupturable plate can securely be ruptured at actuation and the amount of the generated combustion residue of the priming (oxide of the priming components) can be limited to the minimum.

In each of the above inventions, the rupturable plate can be mounted to the opening portion of the inflator housing or the diffuser portion.

(I-3)

An object of the present invention is to provide an inflator capable of facilitating the producing process, enhancing the pressure resistance and durability of the product, and reducing a size and weight thereof, and to provide an air bag apparatus using the same.

The inflator of the present invention can be used as an inflator for a curtain air bag or a side-collision inflator. The following is described in the case of the present invention applied to the inflator for a curtain air bag.

As a solving means of the above problem, the present invention provides an inflator comprising an inflator housing in which a pressurized medium is charged and one end is provided with an opening portion, a diffuser portion which is connected to the opening portion of the inflator housing and is provided with a gas discharging hole for discharging the pressurized medium flowing from the opening portion to the outside at actuation, a rupturable plate closing an outflow path for the pressurized medium between the diffuser portion and the opening portion of the inflator housing, and a rupturing means for the rupturable plate provided in the diffuser portion, wherein the rupturable plate is mounted at an annular member fitted to be integrated with the opening portion of the inflator housing.

In the present invention, such a structure can be employed that the pressurized medium is charged from a clearance between a rim of the opening portion in the inflator housing and the annular member, and the opening portion of the inflator housing and the annular member are joined to each other by a resistance-welding.

Generally, when the pressurized medium is charged into the inflator housing, a thin hole is provided at part of the inflator housing, a sealing pin is inserted into the thin hole so that a little clearance is obtained in the thin hole, the pressurized medium is charged through a groove provided at the sealing pin, and thereafter the inflator housing and the sealing pin are welded together to be sealed. However, according to the method of the invention, the charging process of the pressurized medium can be simplified.

Also, as the solving means of the above object, the present invention provides an inflator comprising an inflator housing in which a pressurized medium is charged and one end is provided with an opening portion, a diffuser portion which is connected to the opening portion of the inflator housing and is provided with a gas discharging hole for discharging the pressurized medium flowing from the opening portion to the outside at actuation, a rupturable plate closing an outflow path for the pressurized medium between the diffuser portion and the opening portion of the inflator housing, and a rupturing means for the rupturable plate provided in the diffuser portion, wherein the inflator housing is connected to the diffuser portion by screwing.

In this invention, such a structure can be employed that the connection of the inflator housing and the diffuser portion is achieved by screwing a screw portion on an outer surface of an end portion in the inflator housing to a screw portion on an inner surface of an end portion in the diffuser portion. The respective screw portions can be either of a female screw portion and a male screw portion.

In this manner, by screwing the inflator housing to the diffuser portion, an existent inert gas cylinder can be directly used as a constituent member, thereby facilitating the manufacturing process and reducing the manufacturing cost.

Since the inflator (I-1) of the present invention has means selected from the requirements (a) to (d), the rupture of the rupturable plate is enhanced so that the reliability in operation of the inflator at actuation thereof becomes high. In case that the inflator (I-1) is used as a side-collision inflator, the gas discharging port 40 is not required, and an air bag is connected to the gas discharging hole 22 directly or via a suitable adapter.

The inflator (I-2) of the present invention is improved in safety at actuation by employing at least one requirement selected from the requirements (a) to (c).

Since the inflator (I-3) of the present invention has a simple structure so that the manufacturing steps can be simplified.

Next, object of the present invention is to provide an inflator (II) in which a size and weight can be reduced and facility in assembling to an air bag apparatus as well as in mounting to a vehicle and safety at actuation or at transportation is improved, and to provide an air bag apparatus using the same.

The inflator (II) of the present invention can be used as an inflator for a curtain airbag or a side-collision inflator, but the following is describe in case of the present invention applied to the inflator for a curtain air bag.

As a solving means of the above problem, the present invention provides an inflator comprising an inflator housing in which a pressurized medium is charged and one end is provided with an opening, a diffuser portion which is fixed to the opening portion of the inflator housing and is provided with a gas discharging hole for discharging the pressurized medium flowing from the opening portion to the outside at actuation, a rupturable plate closing an outflow path for the pressurized medium between the diffuser portion and the opening portion of the inflator housing, and a rupturing means for the rupturable plate provided in the diffuser portion, wherein the outflow direction of the pressurized medium at actuation is coincident with the axial direction of the inflator housing.

As described above, by making the outflow direction of the pressurized medium coincident with the axial direction of the inflator housing, the mounting direction of the inflator and the inflating direction of the curtain air bag are coincident with each other so that the mounting of the inflator in the vehicle is facilitated.

Further, as other solving means of the above problem, the present invention provides an inflator comprising an inflator housing in which a pressurized medium is charged and one end is provided with an opening, a diffuser portion which is fixed to the opening portion of the inflator housing and is provided with a gas discharging hole for discharging the pressurized medium flowing from the opening portion to the outside at actuation, a rupturable plate closing an outflow path for the pressurized medium between the diffuser portion and the opening portion of the inflator housing, and a rupturing means for the rupturable plate provided in the diffuser portion, wherein a gas discharging port connected to the gas discharging hole is further provided, and the pressurized medium discharged from the gas discharging hole passes the gas discharging port to be discharged from the opening portion of the gas discharging port.

In this invention, since a location and direction of the opening portion (outflow opening of the pressurized medium) of the gas discharging port are not limited, by mounting the gas outflow port to the gas discharging hole of the inflator to discharge the pressurized medium therefrom, the mounting is facilitated as compared with a case such that the curtain air bag is mounted to the inflator housing, and thereby, the outflow direction of the pressurized medium can also be optionally controlled.

The above gas discharging port may has a structure such that the gas discharging port and the inflator housing are mounted so that the axial directions of the both are parallel to each other.

Also, as still other solving means of the above problem, the present invention provides an inflator comprising an inflator housing in which a pressurized medium is charged and one end is provided with an opening, a diffuser portion which is fixed to the opening portion of the inflator housing and is provided with a gas discharging hole for discharging the pressurized medium flowing from the opening portion to the outside at actuation, a rupturable plate closing an outflow path for the pressurized medium between the diffuser portion and the opening portion of the inflator housing, and a rupturing means for the rupturable plate provided in the diffuser portion, wherein the gas discharging port is disposed in the extension of the center line of the opening portion in the inflator housing, and the pressurized medium discharged from the gas discharging hole passes the gas discharging port to be discharged from the opening portion of the gas discharging port.

With such a structure, the pressurized medium is discharged smoothly, and the widthwise size (in radial direction) of the inflator can be reduced.

In the above invention, the pressurized medium passes the opening portion of the inflator housing, the inner space of the diffuser portion and the gas discharging port to be discharged from the opening portion of the gas discharging port without changing the outflow direction of the pressurized medium.

In the above invention, the rupturing means for the rupturable plate provided in the diffuser portion can be arranged to face the inner space of the diffuser portion and to position slantingly with respect to the central line of the rupturable plate. Here, "to position slantingly" means that the central axis of the rupturing means crosses slantingly the central line of the rupturable plate.

Further, it is preferable that an angle (θ) formed between the central axis of the rupturing means for the rupturable plate provided in the diffuser portion and the central line of the rupturable plate is acute, more preferably, 10° to less than 90°, further preferably, 40° to 50°. When the angle θ is acute, the widthwise size of the inflator can be small, and the rupturable plate can securely be ruptured, so that outflow of the pressurized medium cannot be blocked.

By adjusting the arrangement of the rupturing means and the rupturable plate in this manner, the rupturable plate can securely be ruptured at a time of actuation of the inflator without enlarging the size, in the widthwise direction, of the inflator.

Furthermore, in the above invention, the rupturing means for the rupturable plate provided in the diffuser portion can be arranged to face the inner space of the diffuser portion and to cross the central line of the rupturable plate perpendicularly. At this time, it is preferable that the rupturable plate closes the outflow path of the pressurized medium in the inner space of the diffuser portion and part of the rupturable plate faces the rupturing means. Furthermore, preferably, the rupturable plate is a cylindrical member having one end closed and the other end open, the plate closes the outflow path of the pressurized medium with its closed end and the peripheral surface, and part of the peripheral surface faces the rupturing means.

By adjusting the arrangement of the rupturing means and the rupturable plate in this manner and by changing the shape of the rupturable plate with reference to the arrangement, the outflow path of the pressurized medium can completely be closed before actuation and the rupturable plate can securely be ruptured at actuation without enlarging the widthwise size of the inflator.

Furthermore, the above gas discharging port can have such a structure that it comprises a cylindrical member having one end closed and the other end open and the pressurized medium flows out from the opening portion.

In case of using such a gas discharging port, since the outflow direction of the pressurized medium from the gas discharging port and the axial direction of the inflator housing are coincident with each other, the mounding direction of the inflator and the inflating direction of the curtain air bag are coincident with each other, thereby facilitating mounting of the inflator to the vehicle.

In the inflator of each of the above inventions, such a structure can be employed that a filter for removing foreign objects in the flowing pressurized medium is provided inside or outside the gas discharging hole, or the gas discharging hole itself is formed with the filter.

Further, in the inflator of each of the above inventions, such a structure can be employed that a filter for removing foreign objects in the flowing pressurized medium is provided inside the gas discharging port.

Further, in the inflator of each of the above inventions, such a structure can be employed that a filter for removing foreign objects in the flowing pressurized medium is provided at the opening portion of the gas discharging port.

In the inflator, the pressurized medium starts discharging due to rupture of the rupturable plate at actuation, when fragments may be made, and the fragments flow out together with the pressurized medium to reach the inside of the curtain air bag to damage the air bag. Therefore, by arranging the filter in the above manner, inflow of the fragments into the air bag can be prevented.

In the inflator of the above invention, in case of the structure such that the gas discharging port is mounted, such a structure can be employed that an adapter for discharging the pressurized medium in the circumferential direction is mounted to the opening portion of the gas discharging port to be attached and removed optionally.

In case that such a structure is employed, even if a fire breaks out at a time of storage before mounting to a vehicle or transportation and the like, and then a contingent happens such that the rupturing means is activated and ruptures the rupturing plate, the pressurized medium is discharged in the circumferential direction due to action of the adapter. Thereby, the inflator itself is prevented from being ejected like a rocket due to eject of the pressurized medium in such a manner as the pressurized medium is ejected in one direction.

Also, as a solving means of the above problem, the present invention provides an inflator comprising an inflator housing in which a pressurized medium is charged and one end is provided with an opening portion, a diffuser portion which is fixed to the opening portion of the inflator housing and is provided with a gas discharging hole for discharging the pressurized medium flowing from the opening to the outside at actuation, a rupturable plate closing an outflow path for the pressurized medium between the diffuser portion and the opening portion of the inflator housing, and a rupturing means for the rupturable plate provided in the diffuser portion, wherein an outflow amount of the pressurized medium at actuation is controlled by a gas discharging hole or a filter provided at the gas discharging hole.

Here, a case such that the filter is provided at the gas discharging hole includes not only a case that the filter is provided inside or outside the gas discharging hole but also a case that the gas discharging hole itself is formed with the filter.

In the above invention, such a structure can be employed that the filter is a annular shape, it covers the gas discharging hole of the diffuser portion from the inside and it is arranged to capture foreign objects contained in the pressurized medium, and further an annular space having a sectional area in the radial direction larger than an opening area of the gas discharging hole is formed between the annular filter and the gas discharging hole to control the outflow amount of the pressurized medium at actuation of the inflator by the gas discharging hole.

Since the annular filter is for preventing foreign objects (fragments of the rupturable plate or the like) from flowing out from the gas discharging hole, a sectional area of the annular filter in the radial direction is set to be larger than the opening area of the gas discharging hole. For this reason, when the pressurized medium flows out through the filter, the pressurized medium is concentrated on only a portion of the filter facing the gas discharging hole, namely, one portion of the filter to flow out, so that an effective filtration can not be achieved. As a result, the foreign objects are also concentrated on only one portion of the filter to be so clogged in the filter, so that the outflow amount of the pressurized medium is lowered. Therefore, by providing the annular space having a sectional area larger than the opening area of he gas discharging hole, such an event can be avoided. Then, by controlling the outflow amount of the pressurized medium as well as providing the annular space, prevention of lowering the outflow amount due to the clogging of the filter can further be effectively enhanced.

In view of the effect of removing foreign objects, the annular filter is required to have a radial sectional area larger than the radial sectional area of the annular space, and preferably, the annular filter is made of one layered porous member such as a punched metal, a plain-stitched wire mesh or the similar member or at least two layered of the porous members.

Further, as other solving means of the above problem, the present invention provides an inflator comprising an inflator housing in which a pressurized medium is charged and one end is provided with an opening portion, a diffuser portion which is fixed to the opening portion of the inflator housing and is provided with a gas discharging-hole for discharging the pressurized medium flowing from the opening portion to the outside at actuation, a rupturable plate closing an out flow path for the pressurized medium between the diffuser portion and the opening of the inflator housing, and a rupturing means for the rupturable plate provided in the diffuser portion, wherein a gas discharging port connected at the gas discharging hole is provided, the pressurized medium discharged from the gas discharging hole passes the gas discharging port to be discharged from the opening of the gas discharging port, and the outflow amount of the pressurized medium at actuation is controlled by opening portion of the gas discharging port or a filter provided in the gas discharging port.

By controlling the flow amount (an outflow amount per unit time) of the pressurized medium at actuation with the gas discharging hole or the opening portion of the gas discharging port in this manner, the outflow amount of the pressurized medium can be prevented from being affected by rupture of the rupturable plate. Such a control of the outflow amount of the pressurized medium can be performed by, for example, the pressure loss (opening area) of the gas discharging hole or the pressure loss of the filter.

Furthermore, as a solving means of the above problem, the present invention provides an inflator comprising an inflator housing in which a pressurized medium is charged and one end is provided with an opening portion, a diffuser portion which is fixed to the opening portion of the inflator housing and is provided with a gas discharging hole for discharging the pressurized medium flowing from the opening to the outside at actuation, a rupturable plate closing an outflow path for the pressurized medium between the diffuser portion and the opening of the inflator housing, and a rupturing means for the rupturable plate provided in the diffuser portion, wherein the outflow amount of the pressurized medium at actuation is controlled by the outflow path of the pressurized medium. Also in the present invention, the gas discharging port having the opening portion connected to the gas discharging hole of the diffuser portion is mounted and the pressurized medium discharged from the gas discharging hole passes the gas discharging port to be discharged from the opening portion of the gas discharging port.

By controlling the outflow amount (an outflow amount per unit time) of the pressurized medium at actuation with the outflow path of the pressurized medium, the outflow amount of the pressurized medium is prevented from being affected by the rupture of the rupturable plate. Such a control of the outflow amount of the pressurized medium can be performed by, for example, the pressure loss (opening area) of the outflow path of the pressurized medium.

In each of the above inventions, such a structure can be employed that the gas discharging port has two or more opening portions only on the side surface, at least two opening portions of the two or more opening portions are positioned symmetrically in the widthwise direction or positioned similarly thereto, and a screen with a plurality of outflow holes is arranged at the position where the opening portion is provided inside the gas discharging port. Here, when the number of opening portions of the gas discharging port is two, the opening portions are positioned symmetrically in the width wise direction. However, when the number of opening portions is three or four or more, it is preferable that the opening portions are arranged in the circumferential direction at equal intervals.

The screen can comprise a cylinder made of one layered porous member such as a punched metal, a plain-stitched wire mesh or the similar member or at least two layered of the porous members. It is preferable that the screen is arranged such that its axial direction is coincident with the axial direction of the gas discharging port.

As described above, by adjusting the position of the opening portion in the gas discharging port, the following effects can be obtained.

(First Effect)

When a fire or the like breaks out during storage/transportation of an inflator and then an accidental event such as a malfunction of the inflator occurs, in case of a gas discharging port having, in the side surface, only one opening portion or closely positioned opening portions, the inflator is ejected like a rocket due to the pressurized medium ejected from the opening portion, which is much dangerous. As described above, however, by positioning at least two opening portions symmetrically in the widthwise direction (in a radial direction when the gas discharging port is cylindrical) or similarly thereto, such an abnormal event is prevented.

(Second Effect)

Since the opening portion is provided on the side surface of the gas discharging port, it is sufficient for the screen to function as a screen at least in a part facing an opening portion. Therefore, a special member in which the positions of the opening portion and an outflow hole of the screen is aligned with each other is not required, and a commercial punched metal, a plain-stitched wire mesh or the like can be used directly, so that materials are inexpensive.

(Third Effect)

Since the opening portion provided in the gas discharging port may be large, it is unnecessary to enhance a size accuracy in processing, by which the process is facilitated.

In each of the inventions, when the inflator is connected to the air bag, such a structure can be employed that the gas discharging port has convex portions continuously in a circumferential direction or at intervals provided on an outer surface from the at least two openings on the side surface to a portion where an air bag is connected. At this time, it is preferable that the convex portion is provided close to the opening.

By providing the above convex portion on the gas discharging port, such an effect can be obtained that a smooth inflation performance of the air bag can be secured when the air bag apparatus is actuated. When the inflator and the air bag are connected to each other, the both are fixed and integrated with each other by a fastening means after the air bag covers the gas discharging port to surround at least opening portion. In this case, if the gas discharging port has a flat shape with an uniform diameter, the air bag contacts tightly the opening portion provided with the side surface of the gas discharging port, so that a clearance through which the pressurized medium passes cannot be obtained between the inner surface of the air bag and the opening portion. Consequently, at a time of actuation of the inflator, specifically, at the initial stage of the actuation, smooth flow of the pressurized medium ejected from the opening portion in the side surface is blocked, and the inflation performance of the air bag may be disturbed. However, by providing the convex portion in the above manner, a clearance which serves as a flow path of the pressurized medium can be secured between the inner surface of the air bag and the opening portion in the side surface, so that such a problem as described above cannot occur.

Also, as a solving means of the above problem, the present invention provides an inflator in which, in connecting an air bag to an inflator having a gas discharging port having the above convex portion, when the gas discharging port is inserted into a cylindrical mouthpiece mounted to the opening portion of the air bag and the mouthpiece and the gas discharging port are connected to each other, a clearance exists between an inner surface of the mouthpiece and an outer surface of an inserted portion of the gas discharging port reaching the convex portion, and a sectional area of the clearance defined by a difference between a widthwise sectional area in the mouthpiece and a widthwise sectional area in the inserted portion of the gas discharging port reaching the projecting portion thereof is larger than the total opening area of a outflow hole of a screen arranged at the gas discharging port, wherein the sectional area of the clearance is larger than the total opening area of the gas discharging hole arranged at the diffuser portion.

By making the sectional area of the clearance larger than the total opening area of the outflow hole of the screen arranged at the gas discharging port or the total opening area of the gas discharging hole arranged at the diffuser portion, the outflow amount of the pressurized medium can be controlled at the screen or the gas discharging hole.

In each of the above inventions, it is preferable that a male screw is provided on the convex portion and a female screw is provided on part of or an entire portion of the mouthpiece, more preferably, part of the mouthpiece (only part to be screwed with the male screw on the convex portion). In order to achieve the above effect and control the outflow amount of the pressurized medium, preferably, a width of the clearance defined between the inner surface of the mouthpiece and the outer surface of the inserted portion of the gas discharging port reaching the convex portion is 1 to 5 mm.

In each of the above inventions, the rupturable plate can be mounted to the opening portion of the inflator housing or the diffuser portion.

Since the outflow direction of the pressurized medium at a time of actuation and the axial direction of the inflator housing are coincident with each other, the inflator (II) of the present invention can inflates and develops the curtain air bag in the same direction as the axial direction of the inflator housing. Thereby, since the inflator may be mounted such that the direction in which the curtain air bag is desired to be inflated and developed and the axial direction of the inflator housing are coincident with each other, a mounting process is facilitated. Furthermore, the inflator of the present invention can be improved in safety at actuation, transportation or the like.

An object of the present invention is to provide a filter means (III) to be mounted on an inflator such as can reduce a size and weight and is improved in mounting easiness and safety at actuation, transportation or the like, and to provide an inflator using the same and an air bag apparatus using the same.

A filter member for an inflator of the present invention can be applied to various inflators but it is specifically suitable for an inflator for an air bag, for example, an inflator for a curtain air bag and an inflator for side-collision. The following is described in a case of the present invention applied to the inflator for a curtain air bag.

As a solving means of the above problem, the present invention provides a filter means for an inflator for removing foreign objects, comprising a disk-shaped supporting body having a predetermined number of through holes and a filter member covering one surface or both surfaces of the disk-shaped supporting body.

It is preferable that the filter member of the present invention is a punched metal or a lath metal, and preferably in a case of a regular square mesh of sieve, one side of the mesh of sieve of the filter member is 0.4 to 2.0 mm, more preferably, 0.6 to 1.0 mm, and further preferably, 0.6 to 0.9 mm.

In the present invention, when both surfaces of the disk-shaped supporting body are covered with filter members, the meshes of sieve on the both surfaces of the filter members can be equal to each other or different from each other.

It is preferable that a screw portion for mounting the filter means to be attached and removed optionally is provided on an outer peripheral surface of the disk-shaped supporting body of the filter means of the above invention.

In the inflator for a curtain air bag, the pressurized medium starts being discharged due to rupture of the rupturable plate at actuation, but there may be made fragments at rupture, and the fragments flow together with the pressurized medium to reach the inside of the curtain air bag, thereby damaging the air bag. Therefore, by arranging such a filter means as the above, the fragments can be prevented from flowing into the air bag.

The above-described filter means for an inflator with a simple structure can remove foreign objects generated at actuation of the inflator, for example, solid materials such as fragments of the rupturable plate, and additionally, the filter means is made to be attached and removed optionally when mounted in the inflator, thereby, an assembling process is facilitated. Furthermore, since different filter means which can remove more than two different foreign objects (namely, filter means with different meshes of sieve) can be combined, a foreign objects removing performance can easily be adjusted according to the capability, the structure or the like of the inflator.

As other solving means of the above problem, the present invention provides an inflator comprising an inflator housing in which a pressurized medium is charged and one end is provided with an opening portion, a diffuser portion which is connected to the opening portion of the inflator housing and is provided with a gas discharging hole for discharging the pressurized medium flowing from the opening to the outside at actuation, a rupturable plate closing an outflow path for the pressurized medium between the diffuser portion and the opening portion of the inflator housing, and a rupturing means for the rupturable plate provided in the diffuser portion, and wherein a gas discharging port which is connected to the gas discharging hole and has one end closed and other end with an opening portion, and one or at least two described above filter means for an inflator for removing foreign objects in the discharged pressurized medium is provided inside the gas discharging port to be attached and removed optionally and movable in the axial direction, and wherein the pressurized medium discharged from the gas discharging hole passes the gas discharging port to be discharged from the opening portion of the gas discharging port.

In the above invention, at least two filter means can be arranged such that they come in contact with each other or they are spaced from each other.

In the above invention, each of at least two filter means may be formed to have the same meshes of sieve or different meshes of sieve of the respective filter members. In case of the mesh of sieve are made different, it is preferable that the meshes of sieve become gradually smaller from the gas discharging hole of the diffuser portion towards the opening portion of the gas discharging port.

According to each of the inventions, even if many foreign objects with different sizes are contained in the pressurized medium, the foreign objects can be collected efficiently and unfailingly, and a smooth discharging of the pressurized medium cannot be disturbed. Further, the foreign object removing performance of the filter means can be controlled to be maintained at a proper level, according to the capability, structure or the like of the inflator.

Furthermore, in the above invention, by providing a screw portion on an inner circumferential surface of the gas discharging port and screwing the disk-shaped supporting body of the filter means for an inflator, it is possible to be mounted to be attached and removed optionally and movable in the axial direction.

With such a structure, it is made easy to mount the filter means for an inflator into the gad discharging port, and if at least two filter means are used, the arrangement of these filter means can be adjusted easily.

Furthermore, in the above invention, the gas discharging port can be mounted such that the axial direction of the gas discharging port and the axial direction of the inflator housing become parallel to each other, and an adapter for discharging the pressurized medium in the circumferential direction can be mounted to be attached and removed optionally at the opening portion of the gas discharging port.

In this manner, by making the outflow direction of the pressurized medium and the axial direction of the inflator housing coincident with to each other, the mounting direction of the inflator and the inflating direction of the curtain air bag are coincident with each other, thereby facilitating mounting work to the vehicle.

With a structure in which an adapter is mounted, even when a fire breaks out during storage, transportation of the inflator before mounting to the vehicle or the like and then accidentally the rupturing means actuates to rupture the rupturable plate, the pressurized medium is discharged in the circumferential direction due to action of the adapter. Thereby, the inflator itself is prevented from being ejected like a rocket due to ejecting of the pressurized medium when the pressurized medium ejected in one direction.

An inflator assembled with the filter means of the present invention can be mounted easily and additionally the foreign object removing performance can be adjusted according to capability, structure or the like of the inflator.

Also, the present invention provides an air bag apparatus comprising an activation signal-outputting means including an impact sensor and a control unit and a module case accommodating the above inflator (I), (II) or (III) and an air bag.

Figure 1:
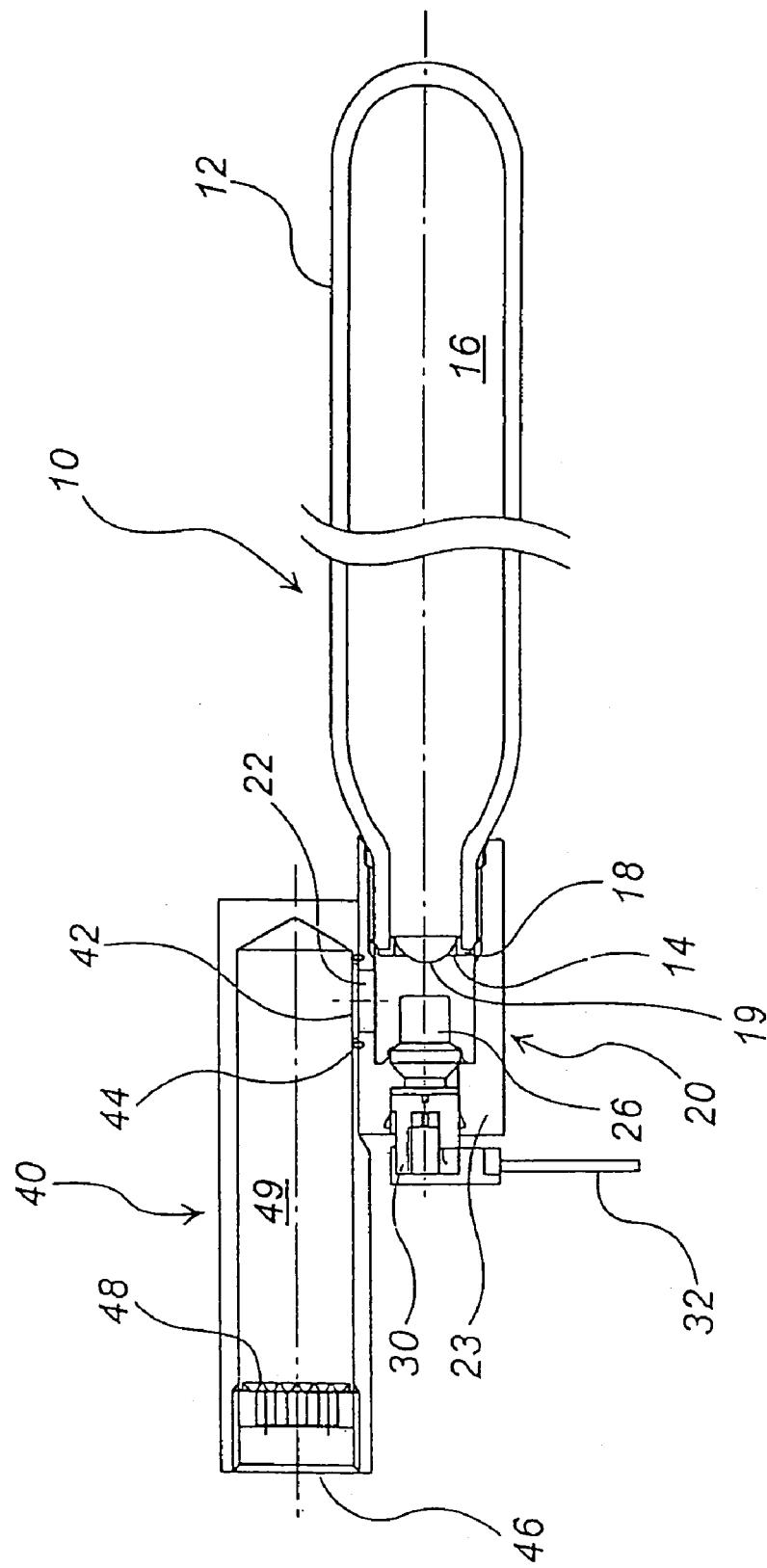
FIG. 1 is a sectional view of an inflator (I) of the present invention in the longitudinal direction.

Numerals in the figures will be explained.
10 inflator
12 inflator housing
14 opening portion
19 rupturable plate
20 diffuser portion
22 gas discharging hole
26 igniter
40 gas discharging port
42 communication hole
48 filter
310 inflator
312 inflator housing
314 opening portion
319 rupturable plate
320 diffuser portion
322 gas discharging hole
326 igniter
340 gas discharging port
342 communication hole
348 filter
510 inflator
512 inflator housing
514 opening portion
519 rupturable plate
520 diffuser portion
522 gas discharging hole
526 igniter
540 gas discharging port
542 communication hole
548 filter
400 filter means

PREFERRED EMBODIMENT OF THE INVENTION (I)

Figure 4:
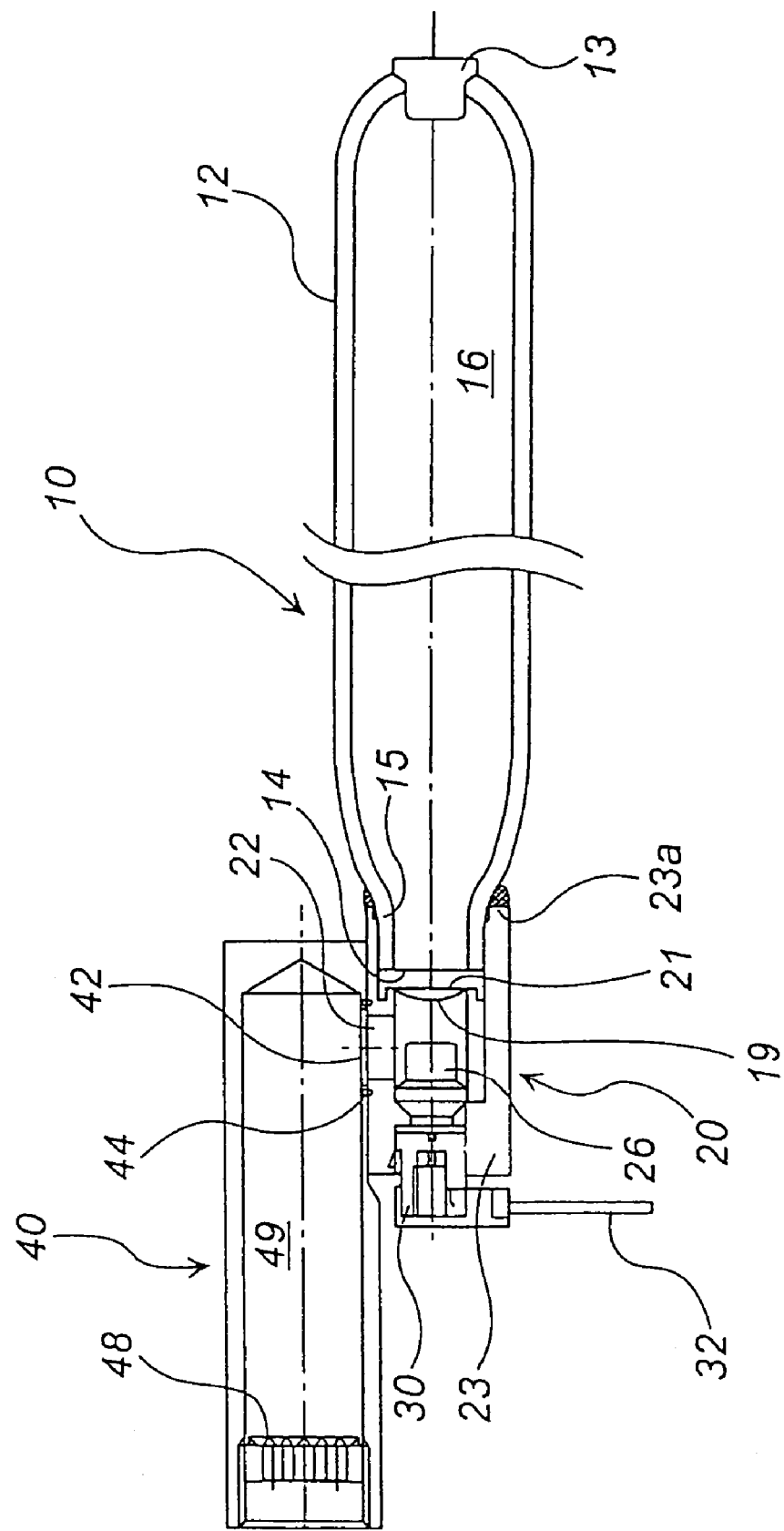
FIG. 4 is a sectional view of other embodiment of the inflator (I) of the present invention in the longitudinal direction.

One embodiment of the present invention (I-1) will be explained with reference to the drawings. FIG. 1 is a sectional view of an inflator 10 of the invention in the longitudinal direction, and FIG. 4 is a sectional view of an inflator 10 of other embodiment in the longitudinal direction.

An inflator housing 12 has an opening portion 14 in one end and the other end closed. A pressurized medium comprising an inert gas such as argon, helium or a nitrogen gas is charged into the inner space 16 at the maximum pressure of about 70,000 kPa. The inflator housing 12 in the widthwise direction has a circular section, and the opening portion 14 is also circular.

The inflator housing 12 may be formed by utilizing an existent gas cylinder, and it maybe produced by swaging a pipe. A pressurized medium is charged into an inflator 10 shown in FIG. 1 from an opening portion 14 of the inflator housing 12. In the inflator 10 shown in FIG. 4, a pressurized medium is charged from a clearance between a thin hole and a sealing pin 13 inserted therein after a diffuser portion 20 is connected to the inflator housing 12, and then the inflator housing 12 is welded at the sealing pin 13 to be closed completely.

The diffuser portion 20 is connected in the opening portion 14 of the inflator housing 12. An outer shell of the diffuser portion 20 is formed of a diffuser housing 23 and a gas discharging hole 22 for discharging the pressurized medium outside is provided on the periphery of the outer shell.

The inflator housing 12 and the diffuser portion 20 may be connected by a welding or they may be connected by screwing a male screw portion provided on the periphery of the end portion in the inflator housing 12 into a female screw portion provided on the inner peripheral surface of the end portion in the diffuser portion 20.

The opening portion 14 of the inflator housing 12 is closed with a rupturable plate 19 in a bowl-like shape, and, before actuation of the inflator, the inner space 16 of the inflator housing 12 is maintained at a high pressure in a hermetic state. A gas discharging hole 22 of the diffuser portion 20 is not closed.

An igniter 26 having a priming is provided in the diffuser portion 20 as a rupturing means for the rupturable plate 19. The igniter 26 is fitted into the diffuser housing 23 to be mounted to the diffuser portion 20. Numeral 30 denotes a connector, and 32 denotes a lead wire for connecting to a power supply.

A gas discharging port 40 is connected to the diffuser portion 20, and they are connected at a welded portion 44 by welding after the gas discharging hole 22 of the diffuser portion 20 and a communication hole 42 of the gas discharging port 40 are met with each other.

The gas discharging port 40 is mounted such that the central axis (shown in a dotted chain line in FIG. 1) of the inflator housing 12 and the central axis (shown in a dotted chain line in FIG. 1) of the gas discharging port 40 is parallel to each other.

The gas discharging port 40 comprises a cylindrical member having one end closed and the other end formed with an opening portion 46, and a filter 48 for removing foreign objects is provided in the vicinity of the opening portion 46. An example of the filter 48 can be a wire mesh or a laminated body of wire mesh. A location of the filter 48 is not particularly limited if foreign objects can be removed from the discharging pressurized medium. For example, the filter 48 can be disposed to cover the communication hole 42 from the flow-path 49 of the pressurized medium.

In the inflator 10 of the present embodiment, means described in the requirements (a) to (d) are provided as means for enhancing rupture of the rupturable plate 19.

(1) A Means Shown in the Requirement (a)

Figure 2:
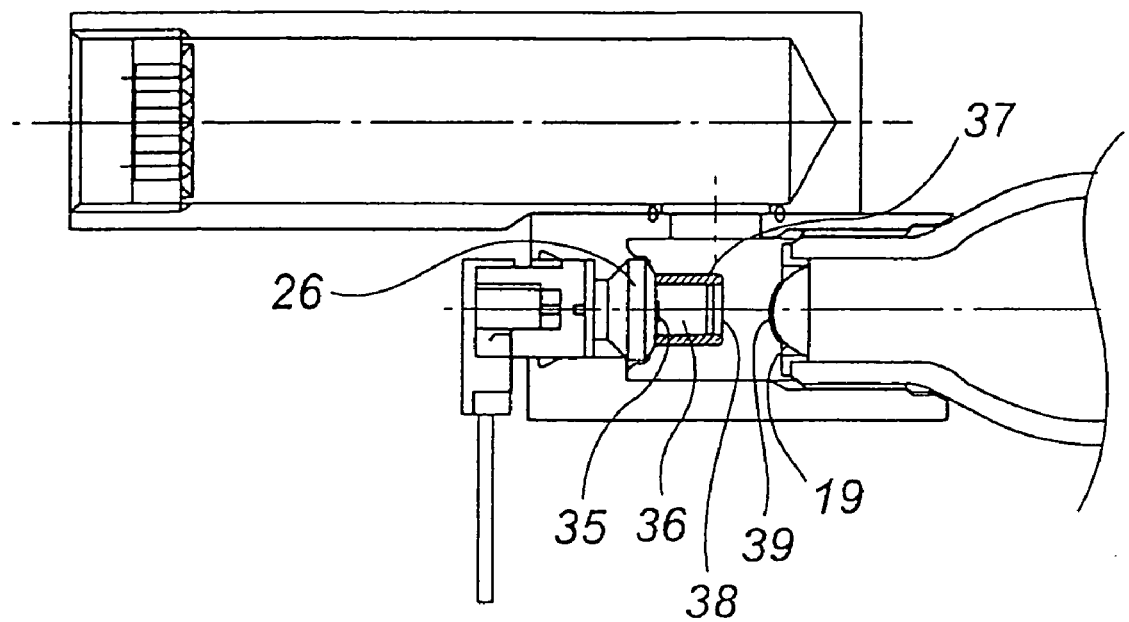
FIG. 2 is a partially enlarged view of the inflator shown in FIG. 1.

As shown in FIG. 2, in the igniter 26, a cylindrical charge holder 37 is provided to surround an igniting portion 35 and a disk-shaped priming 36, and a side, of the charge holder 37, facing the rupturable plate 19 is open. This charge holder 37 gives directivity to detonation waves generated due to combustion of the priming. Incidentally, numeral 38 denotes a cup in the requirement (b)

(2) A Means Shown in the Requirement (b)

Figure 3:
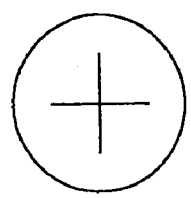
FIG. 3 is a view for explaining a state of a cup surface or a rupturable plate surface in FIG. 1.

The cup 38 is arranged to include the igniting portion 35 and the priming 36 of the igniter 26, and as shown in FIG. 3, a cross-shaped notch as a fragile portion is applied on an outer surface, in the cup 38, which faces the rupturable plate 19, so that the cup 38 is ruptured at the cross-shaped notch and the directivity is given to the detonation wave.

(3) A Means Shown in the Requirement (c)

A small amount of an explosive 39 is attached to a convex surface of the bowl-like rupturable plate 19, and when this part is heated, the explosive is ignited and burnt by the heat, thereby promoting rupture of the rupturable plate 19.

(4) A Means Shown in the Requirement (d)

The cross-shaped notch of the fragile portion, as shown in FIG. 3, is applied to a convex surface or a concave surface of the bowl-like rupturable plate 19, so that rupture of the rupturable plate 19 is promoted by the cross-shaped notch.

Next, other embodiment shown in FIG. 4 will be described. An inflator 10 shown in FIG. 4 has the same structure as the inflator 10 shown in FIG. 1 except for a location of a rupturable plate 19 and a method of charging a pressurized medium (the sealing pin 13 is provided).

In the inflator 10 shown in FIG. 1, the rupturable plate 19 is mounted to the opening portion 14 of the inflator housing 12, but in the inflator 10 shown in FIG. 4, the rupturable plate 19 is mounted to a rim of an opening 21 of the diffuser portion, 20. The opening portion 14 of the inflator housing 12 and the opening 21 of the diffuser portion 20 may be arranged to abut each other. However, as shown in FIG. 3, it is desirable that they are arranged to obtain a clearance between the opening portion 14 and the rupturable plate 19. The size of the clearance can be adjusted by properly setting the length from the opening 21 to a tip end portion 23a of the diffuser housing 23 in the diffuser portion 20. In this case, joining by welding can be easily performed by abutting the tip end portion 23a against an expanded portion 15 of the inflator housing 12.

Next, the operation of the inflator 10 of the present invention will be described. At the time of being mounted to a vehicle, the inflator 10 is disposed, being included in a system comprising such as an activation signal-outputting means which comprises an impact sensor and a control unit, and a module case accommodating the above-described inflator 10 and a curtain air bag. The curtain air bag is connected at the opening portion 46 of the gas discharging port 40.

First, when the vehicle receives an impact, the igniter 26 is activated upon receiving the signal from the impact sensor of the system, and the priming is ignited and burnt so that the rupturable plate 19 is ruptured. By providing the means described in the requirements (a) to (d), rupture of the rupturable plate 19 is promoted at the time of rupturing.

Since the opening portion 14 is opened due to the rupture of the rupturable plate 19, the pressurized medium in the inner space 16 flows out from the gas discharging hole 22 into the gas discharging port 40 via the communication hole 42, and further, it is discharged from the opening portion 46 via the filter 48 to inflate the curtain air bag. Incidentally, even if fragments are made at the rupture of the rupturable plate 19, they are removed by the filter 48 so that they are prevented from being discharged into the curtain air bag.

Next, an embodiment of the present invention (I-2) will be described with reference to the drawings. FIG. 1 is a sectional view of the inflator 10 of the present invention in the longitudinal direction, and FIG. 4 is a sectional view of other embodiment in the longitudinal direction.

An inflator housing 12 has an opening portion 14 in one end and the other end closed. A pressurized medium comprising an inert gas such as argon, helium or a nitrogen gas is charged into the inner space 16 at the maximum pressure of about 70,000 kPa. The inflator housing 12 in the widthwise direction has a circular section, and the opening portion 14 is also circular.

The inflator housing 12 may be formed by utilizing an existent gas cylinder, and it may be produced by swaging a pipe. A pressurized medium is charged into an inflator 10 shown in FIG. 1 from an opening portion 14 of the inflator housing 12. In the inflator 10 shown in FIG. 4, a pressurized medium is charged from a clearance between a thin hole and a sealing pin 13 inserted therein after a diffuser portion 20 is connected to the inflator housing 12, and then the inflator housing 12 is welded at the sealing pin 13 to be closed completely.

The diffuser portion 20 is connected in the opening portion 14 of the inflator housing 12. An outer shell of the diffuser portion 20 is formed of a diffuser housing 23 and a gas discharging hole 22 for discharging the pressurized medium outside is provided on the periphery of the outer shell.

The inflator housing 12 and the diffuser portion 20 may be connected by a welding or they may be connected by screwing a male screw portion provided on the periphery of the end portion in the inflator housing 12 into a female screw portion provided on the inner peripheral surface of the end portion in the diffuser portion 20.

The opening portion 14 of the inflator housing 12 is closed with a rupturable plate 19 in a bowl-like shape, and, before actuation of the inflator, the inner space 16 of the inflator housing 12 is maintained at a high pressure in a hermetic state. A gas discharging hole 22 of the diffuser portion 20 is not closed.

The bowl-like rupturable plate 19, is made of nickel alloy and has a thickness of about 0.8 mm or less. A notch in a cross-shape, an X-like shape, or a Y-like shape or the like is applied to both or either of a convex surface and concave surface thereof. [Requirement (a)] The depth or a size of the notch is adjusted, with reference to the strength of the rupturable plate 19, such that the rupturable plate is not ruptured before actuation and that the rupturable plate is ruptured by an detonation wave without making any fragments at actuation.

An igniter 26 having a priming is provided in the diffuser portion 20 as a rupturing means for the rupturable plate 19. The igniter 26 is fitted into the diffuser housing 23 to be mounted to the diffuser portion 20. Numeral 30 denotes a connector, and 32 denotes a lead wire for connecting to a power supply. The priming contains zirconium/potassium perchlorate as a main component in an amount of 280 mg or less, and the lower limit of the content is adjusted with reference to the strength of the rupturable plate 19. [Requirement (c)]

A gas discharging port 40 is connected to the diffuser portion 20, and they are connected at a welded portion 44 by welding after the gas discharging hole 22 of the diffuser portion 20 and a communication hole 42 of the gas discharging port 40 are met with each other.

The gas discharging port 40 is mounted such that the central axis (shown in a dotted chain line in FIG. 1) of the inflator housing 12 and the central axis (shown in a dotted chain line in FIG. 1) of the gas discharging port 40 is parallel to each other.

The gas discharging port 40 comprises a cylindrical member having one end closed and the other end formed with an opening portion 46, and a filter 48 for removing foreign objects is provided in the vicinity of the opening portion 46. [Requirement (b)] An example of the filter 48 can be a wire mesh or a laminated body of wire mesh. The filter 48 can be disposed to cover the communication hole 42 from the flow-path 49 of the pressurized medium.

Next, other embodiment shown in FIG. 2 will be explained. An inflator 10 shown in FIG. 2 has the same structure as the inflator 10 shown in FIG. 1 except for a location of the rupturable plate 19 and a method of charging the pressurized medium (a sealing pin 13 is provided).

In the inflator 10 shown in FIG. 1, the rupturable plate 19 is mounted to the opening portion 14 of the inflator housing 12, but in the inflator 10 shown in FIG. 2, the rupturable plate 19 is mounted to a rim of an opening 21 of the diffuser portion 20. The opening portion 14 of the inflator housing 12 and the opening 21 of the diffuser portion 20 may be arranged to abut each other. However, as shown in FIG. 3, it is desirable that they are arranged to obtain a clearance between the opening portion 14 and the rupturable plate 19. The size of the clearance can be adjusted by properly setting the length from the opening 21 to a tip end portion 23a of the diffuser housing 23 in the diffuser portion 20. In this case, joining by welding can be easily performed by abutting the tip end portion 23a against an expanded portion 15 of the inflator housing 12.

Next, the operation of the inflator 10 of the present invention will be described. At the time of being mounted to a vehicle, the inflator 10 is disposed, being included in a system comprising such as an activation signal-outputting means which comprises an impact sensor and a control unit, and a module case accommodating the above-described inflator 10 and a curtain air bag. The curtain air bag is connected at the opening portion 46 of the gas discharging port 40.

First, when the vehicle receives an impact, the igniter 26 is activated upon receiving the signal from the impact sensor of the system, and the priming is ignited and burnt so that the rupturable plate 19 is ruptured. At this time, since a notch in a cross-shape, a X-like shape or the like is applied to the rupturable plate 19, the rupturable plate 19 laps at four portions to open at the cross point without making any fragments.

Also, when the priming is burnt, black powder of zirconium oxide (ZrO) is inevitably generated. However, the amount of zirconium-potassium perchlorate is adjusted, so that the amount of generation of the black powder can be limited to the minimum amount. In this case, for example, if zirconium-potassium perchlorate is used in an amount of 300 mg or so, the black powder is generated in the air bag in such an amount as can be distinctly recognized, which makes the occupant uneasy or alarmed, and additionally, there is always a possibility such that the air bag may be damaged.

Since the opening portion 14 is opened due to the rupture of the rupturable plate 19, the pressurized medium in the inner space 16 flows out from the gas discharging hole 22 into the gas discharging port 40 via the communication hole 42, and further, it is discharged from the opening portion 46 via the filter 48 to inflate the curtain air bag.

Furthermore, even if fragments are made at rupture of the rupturable plate 19, the fragments are removed by the filter 48 so that they are prevented from being discharged into the curtain air bag. In this case, part of the black powder is also removed by the filter 48.

Incidentally, when the inflator of the present invention is used as an inflator for a side collision, the gas discharging port 40 is unnecessary and the gas discharging hole 22 is connected to an air bag directly or via a proper adapter.

Next, one embodiment of the present invention (I-3) will be described with reference to the drawings. FIG. 1 is a sectional view of an inflator 10 of the present invention in the longitudinal direction.

An inflator housing 12 has an opening portion 14 in one end and the other end closed. A pressurized medium comprising an inert gas such as argon, helium or a nitrogen gas is charged into the inner space 16 at the maximum pressure of about 70,000 kPa. The inflator housing 12 in the widthwise direction has a circular section, and the opening portion 14 is also circular.

The inflator housing 12 maybe produced by swaging a pipe, in order to facilitate manufacturing process, it may be formed by utilizing an existent gas cylinder.

The diffuser portion 20 is connected in the opening portion 14 of the inflator housing 12. An outer shell of the diffuser portion 20 is formed of a diffuser housing 23 and a gas discharging hole 22 for discharging the pressurized medium outside is provided on the periphery of the outer shell.

The opening portion 14 of the inflator housing 12 is closed with a rupturable plate 19 in a bowl-like shape which is mounted via an annular member 18, and, before actuation of the inflator, the inner space 16 of the inflator housing 12 is maintained at a high pressure in a hermetic state. A gas discharging hole 22 of the diffuser portion 20 is not closed.

An igniter 26 having a priming is provided in the diffuser portion 20 as a rupturing means for the rupturable plate 19. The igniter 26 is fitted into the diffuser housing 23 to be mounted to the diffuser portion 20. Numeral 30 denotes a connector, and 32 denotes a lead wire for connecting to a power supply.

A gas discharging port 40 is connected to the diffuser portion 20, and they are connected at a welded portion 44, by welding after the gas discharging hole 22 of the diffuser portion 20 and a communication hole 42 of the gas discharging port 40 are met with each other.

The gas discharging port 40 is mounted such that the central axis (shown in a dotted chain line in FIG. 1) of the inflator housing 12 and the central axis (shown in a dotted chain line in FIG. 1) of the gas discharging port 40 is parallel to each other.

The gas discharging port 40 comprises a cylindrical member having one end closed and the other end formed with an opening portion 46, and a filter 48 for removing foreign objects is provided in the vicinity of the opening portion 46. An example of the filter 48 can be a wire mesh or a laminated body of wire mesh. A location of the filter 48 is not particularly limited if foreign objects can be removed from the discharging pressurized medium. For example, the filter 48 can be disposed to cover the communication hole 42 from the flow-path 49 of the pressurized medium.

Figure 5:
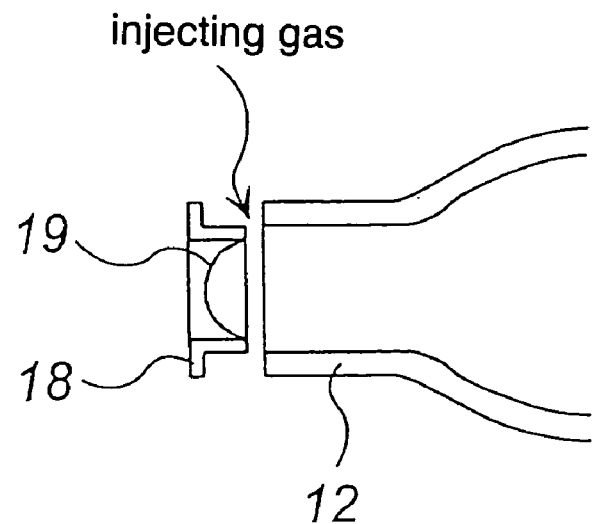
FIG. 5 is a view for explaining a manufacturing process of the inflator shown in FIG. 1.
Figure 6:
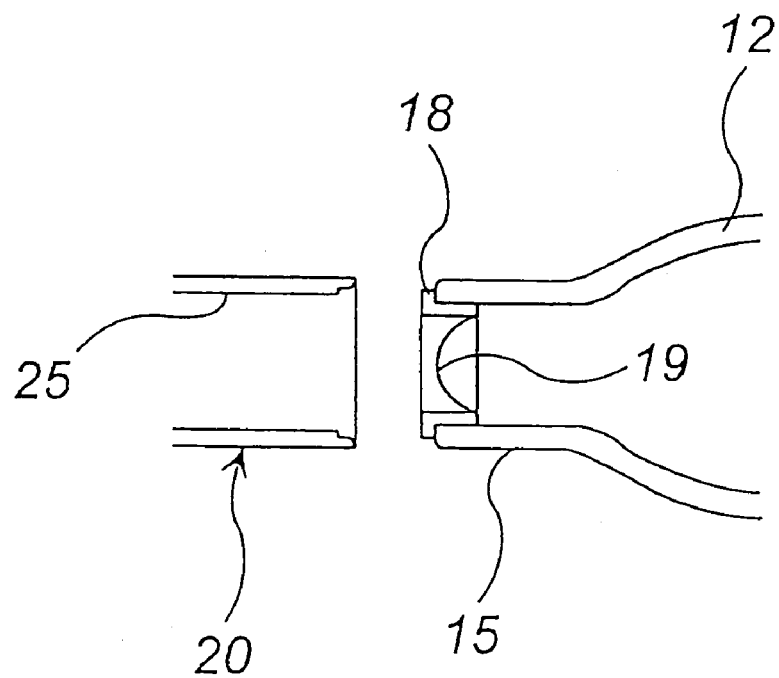
FIG. 6 is a view for explaining a manufacturing process of the inflator shown in FIG. 1.
Figure 7:
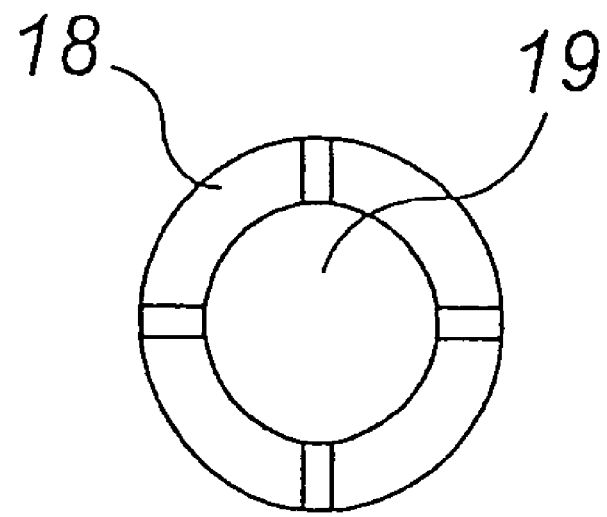
FIG. 7 is a view for explaining a manufacturing process of the inflator shown in FIG. 1.

Part of a manufacturing method of the inflator 10 will be explained. As shown in FIGS. 5 and 6, the rupturable plate 19 is welded and fixed at an opening of the annular member 18, and the annular member 18 is fixed by resistance-welding after the annular member 18 is fitted into the opening portion 14 of the inflator housing 12. Inert gas (pressurized medium) is charged from a little clearance remaining between the annular member 18 and the opening portion 14 after the annular member 18 is fitted but before the resistance-welding, and thereafter the resistance-welding is performed. FIG. 7 is a plan view of the annular member 18.

The inflator housing 12 and the diffuser portion 20 is by screwing a male screw portion (or female screw portion) provided on the outer surface of the end portion in the inflator housing 12 into a female screw portion (or male screw portion) provided on the inner surface of the end portion in the diffuser portion 20.

Next, the operation of the inflator 10 of the present invention will be described. At the time of being mounted to a vehicle, the inflator 10 is disposed, being included in a system comprising such as an activation signal-outputting means which comprises an impact sensor and a control unit, and a module case accommodating the above-described inflator 10 and a curtain air bag. The curtain air bag is connected at the opening portion 46 of the gas discharging port 40.

First, when the vehicle receives an impact, the igniter 26 is activated upon receiving the signal from the impact sensor of the system, and the priming is ignited and burnt so that the rupturable plate 19 is ruptured.

Since the opening portion 14 is opened due to the rupture of the rupturable plate 19, the pressurized medium in the inner space 16 flows out from the gas discharging hole 22 into the gas discharging port 40 via the communication hole 42, and further, it is discharged from the opening portion 46 via the filter 48 to inflate the curtain air bag.

In the series of operations, when the pressurized medium is discharged from the opening portion 46 of the gas discharging port 40, the flow direction of the pressurized medium is coincident with the direction of the center axis of the gas discharging port 40 so that the flow direction is coincident with the direction of the center axis of the inflator housing 12. Thereby, the curtain air bag connected to the opening portion 46 of the gas discharging port 40 inflates and develops in the same direction as the flow direction of the pressurized medium.

Furthermore, if fragments are made at rupture of the rupturable plate 19, the fragments are removed by the filter 48 so that they are prevented from being discharged into the curtain air bag.

Incidentally, if the inflator of the present invention is used as a inflator for a side collision, the gas discharging port 40 is unnecessary and the gas discharging hole 22 is connected with an air bag directly or via a proper adapter.

PREFERRED EMBODIMENT OF THE INVENTION (II)

Figure 8:
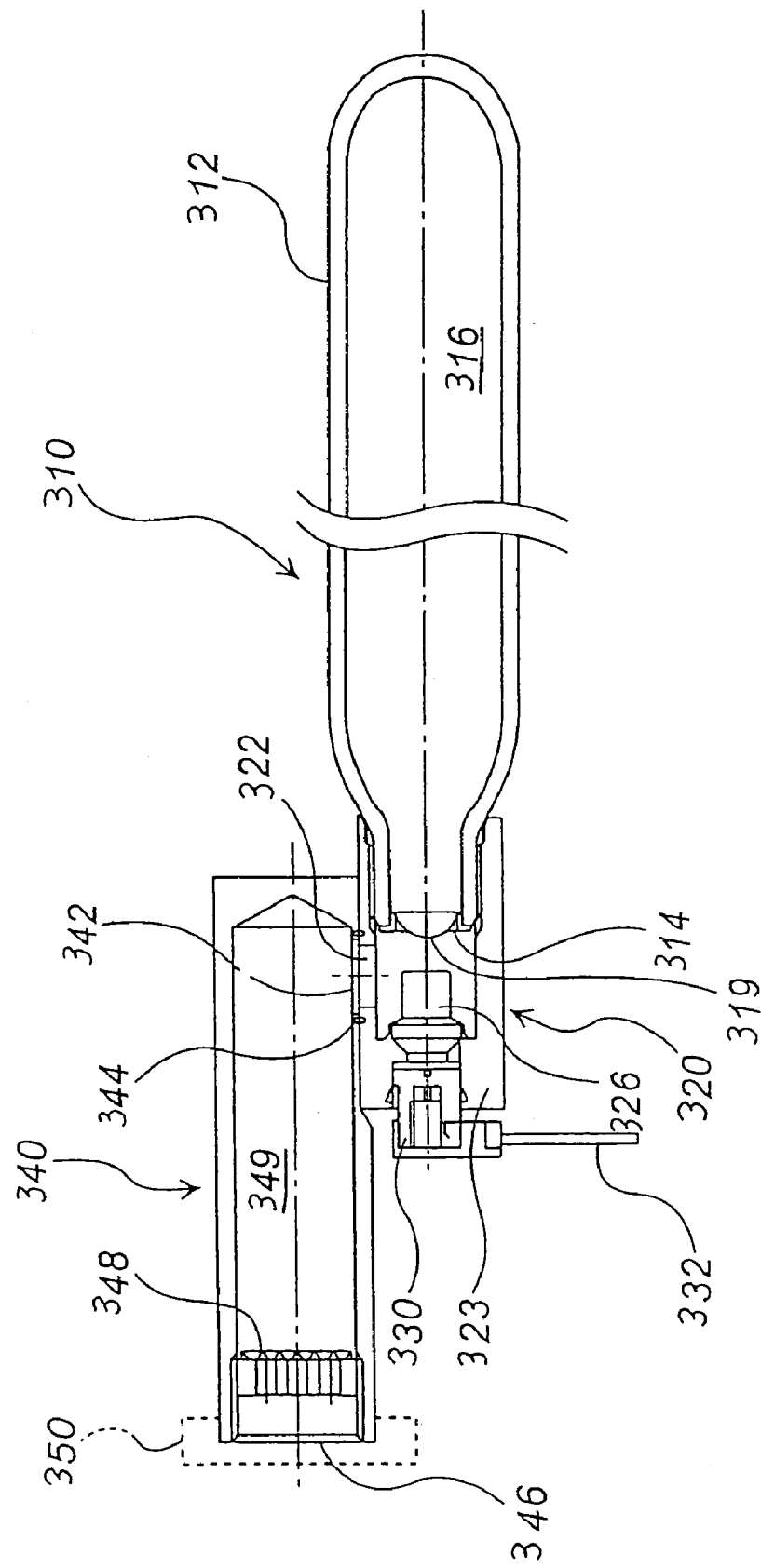
FIG. 8 is a sectional view of an inflator (II) of the present invention in the longitudinal direction.
Figure 9:
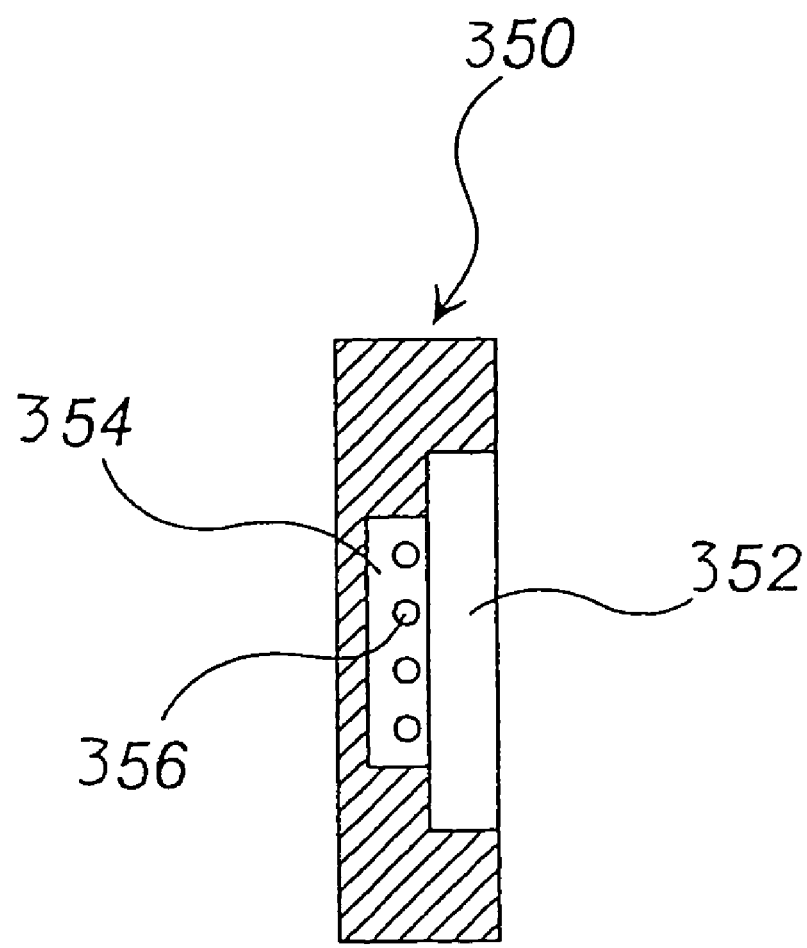
FIG. 9 is a sectional view of an adapter mounted to the inflator (II) in the diametrical direction.
Figure 10:
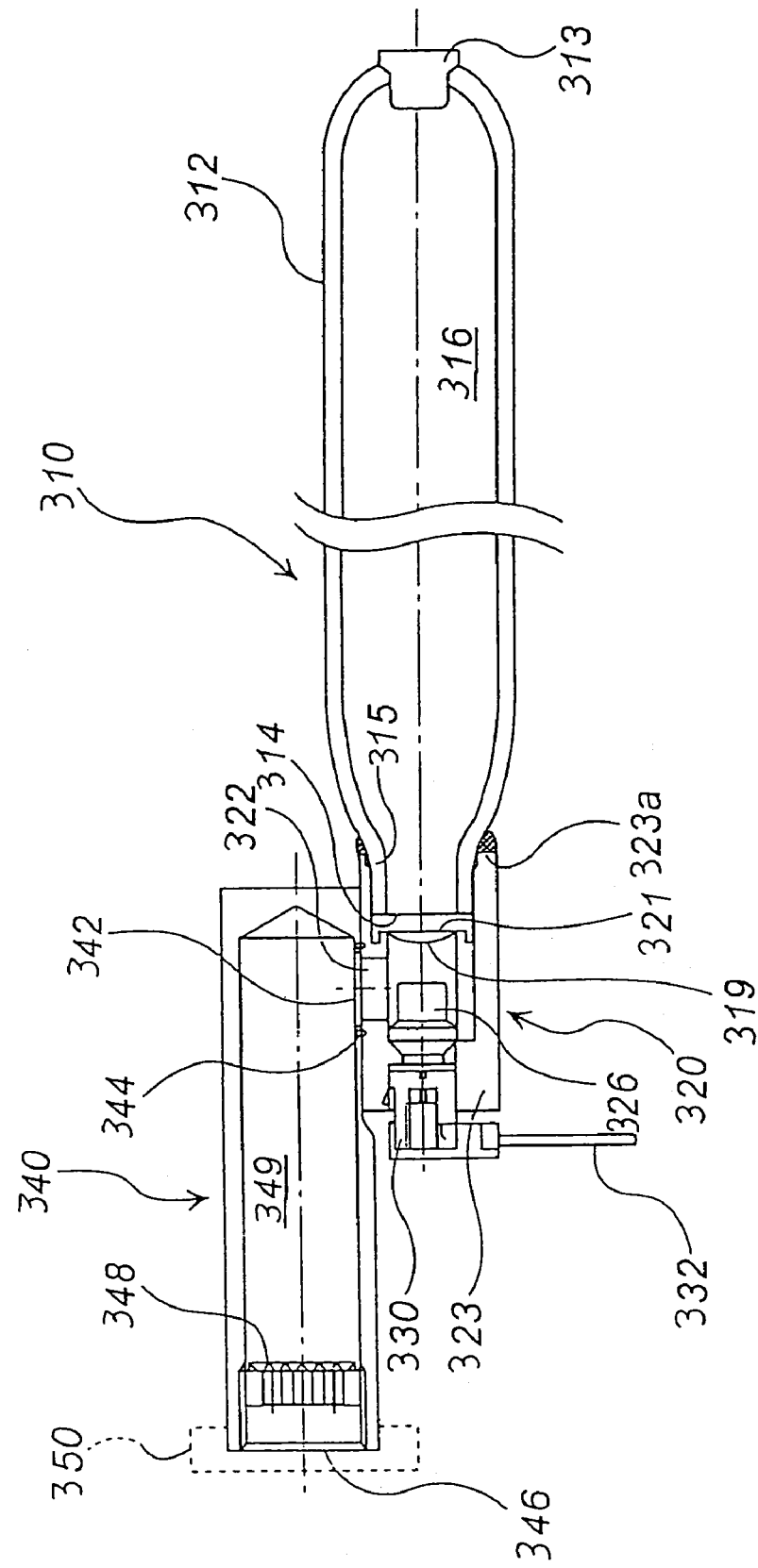
FIG. 10 is a sectional view of other embodiment of the inflator (II) of the present invention in the longitudinal direction.
Figure 11:
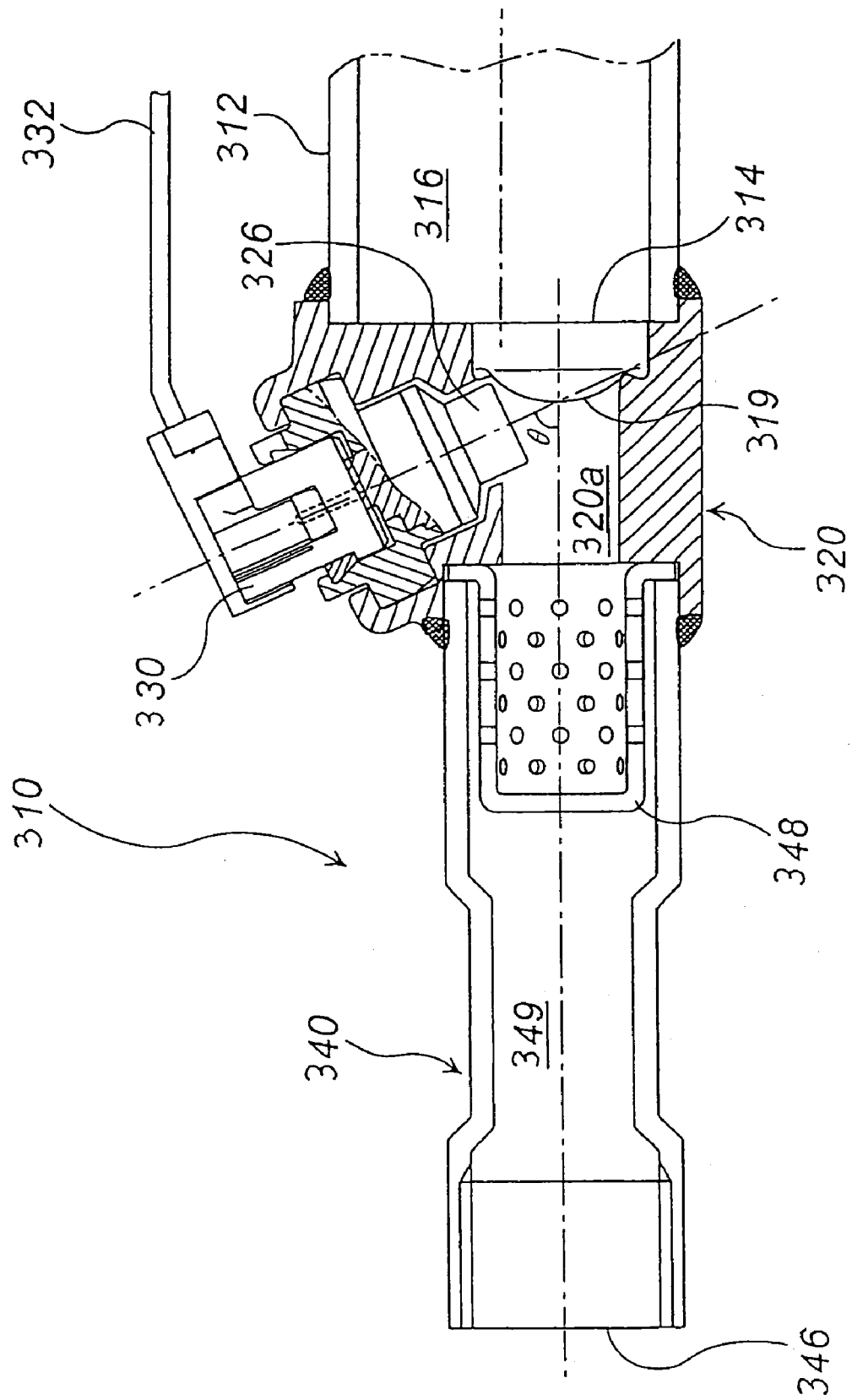
FIG. 11 is a partial sectional view of other embodiment of the inflator (II) of the present invention in the longitudinal direction.
Figure 12:
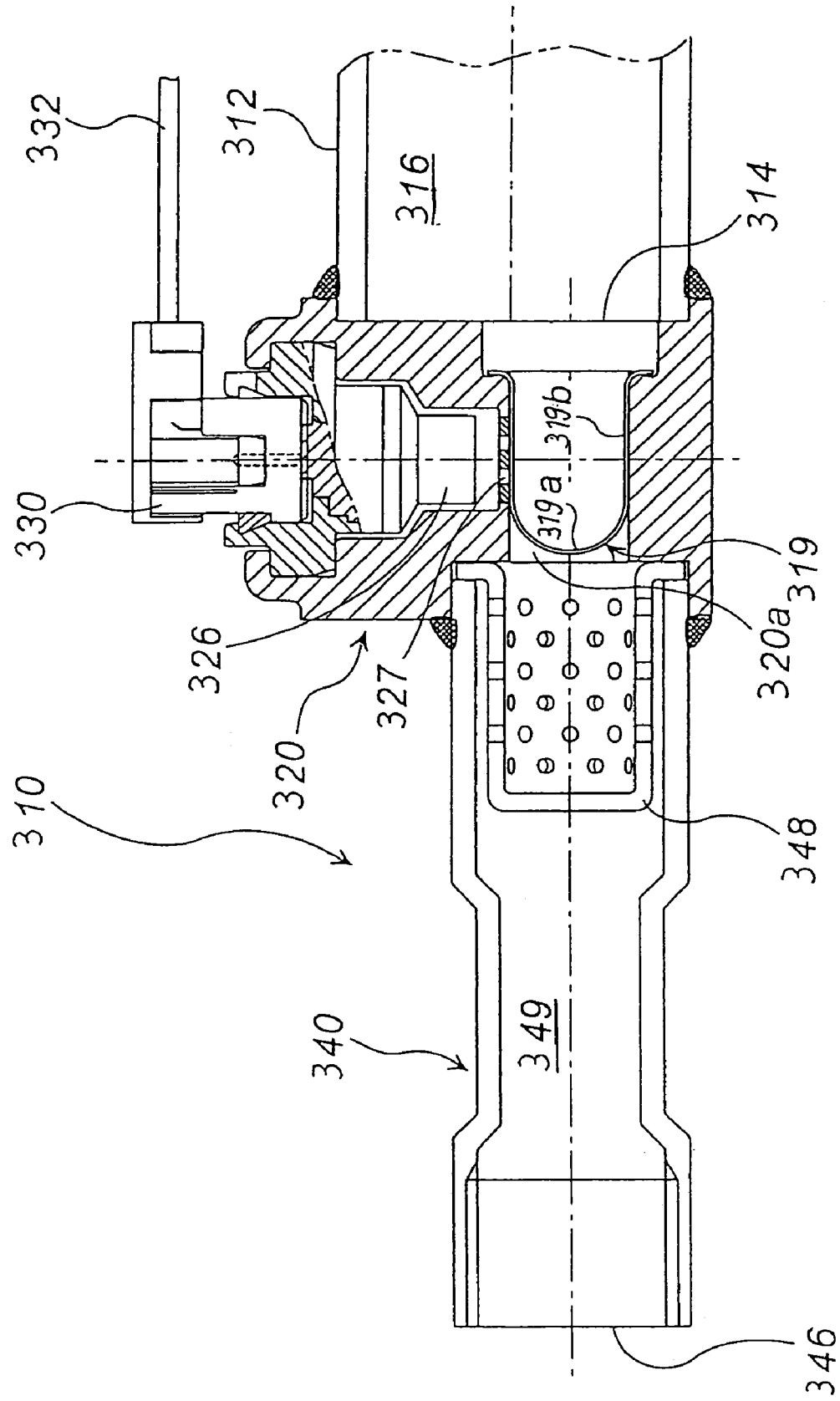
FIG. 12 is a partial sectional view of other embodiment of the inflator (II) of the present invention in the longitudinal direction.

One embodiment of the present invention will be described below with reference to the drawings. FIG. 8 is a sectional view of an inflator 310 of the present invention in the longitudinal direction, FIG. 9 is a sectional view of an adapter which is an attachment mounted to the inflator shown in FIG. 8, FIG. 10 is a sectional view of an inflator 310 of other embodiment in the longitudinal direction, and FIGS. 11 and 12 are partially sectional views of inflators 310 of other embodiments in the longitudinal directions.

First, an embodiment shown in FIG. 8 will be explained. An inflator housing 312 has an opening portion 314 in one end and the other end closed. A pressurized medium comprising an inert gas such as argon, helium or a nitrogen gas is charged into the inner space 316 at the maximum pressure of about 70,000 kPa. The inflator housing 312 in the widthwise direction has a circular section, and the opening portion 314 is also circular.

The inflator housing 312 may be formed by utilizing an existent gas cylinder, and it may be produced by swaging a pipe or applying a pipe spinning. A pressurized medium is charged into an inflator 310 shown in FIG. 8 from an opening portion 314 of the inflator housing 312. In the inflator 310 shown in FIG. 10, a pressurized medium is charged from a clearance between a thin hole and a sealing pin 313 inserted therein after a diffuser portion 320 is connected to the inflator housing 312, and then the inflator housing 312 is welded at the sealing pin 313 to be closed completely.

The diffuser portion 320 is connected in the opening portion 314 of the inflator housing 312. An outer shell of the diffuser portion 320 is formed of a diffuser housing 323 and a gas discharging hole 322 for discharging the pressurized medium outside is provided on the periphery of the outer shell.

The inflator housing 312 and the diffuser portion 320 may be connected by a welding or they may be connected by screwing a male screw portion provided on the periphery of the end portion in the inflator housing 312 into a female screw portion provided on the inner peripheral surface of the end portion in the diffuser portion 320.

The opening portion 314 of the inflator housing 312 is closed with a rupturable plate 319 in a bowl-like shape, and, before actuation of the inflator, the inner space 316 of the inflator housing 312 is maintained at a high pressure in a hermetic state. A gas discharging hole 322 of the diffuser portion 320 is not closed.

An igniter 326 having a priming is provided in the diffuser portion 320 as a rupturing means for the rupturable plate 319. The igniter 326 is fitted into the diffuser housing 323 to be mounted to the diffuser portion 320. Numeral 330 denotes a connector, and 332 denotes a lead wire for connecting to a power supply.

A gas discharging port 340 is connected to the diffuser portion 320, and they are connected at a welded portion 344 by welding after the gas discharging hole 322 of the diffuser portion 320 and a communication hole 342 of the gas discharging port 340 are met with each other.

The gas discharging port 340 is mounted such that the central axis (shown in a dotted chain line in FIG. 8) of the inflator housing 312 and the central axis (shown in a dotted chain line in FIG. 8) of the gas discharging port 340 is parallel to each other.

The gas discharging port 340 comprises a cylindrical member having one end closed and the other end formed with an opening portion 346, and a filter 348 for removing foreign objects is provided in the vicinity of the opening portion 346. An example of the filter 348 can be a wire mesh or a laminated body of wire mesh. A location of the filter 348 is not particularly limited if foreign objects can be removed from the discharging pressurized medium. For example, the filter 348 can be disposed to cover the communication hole 342 from the flow-path 349 of the pressurized medium.

An adapter 350 can be mounted to the opening portion 346 of the gas discharging port 340 to be attached or removed optionally at storage and transportation. The adapter 350 is a disk-like member or a cylindrical member, it has therein a concave portion 352 to receive an end portion of the opening portion in the gas discharging port 340 and another concave portion having a smaller diameter than that of the concave portion 352, and a plurality of ejecting holes 356 of through-holes piercing to an outer peripheral surface are provided in the concave portion 354. Incidentally, the adapter 350 can be made of an elastic member such as a rubber, plastics or the like in order to enhance an connecting with the gas discharging port 340, and an unillustrated fastening member such as a screw or the like can further be provided.

In this embodiment, the outflow rate of the pressurized medium is controlled by setting the opening area of the gas discharging hole 322 to preferably 5 to 500 mm$^2$, more preferably 10 to 250 mm$^2$ and further preferably 12 to 113 mm$^2$. Incidentally, a method for measuring a pressure loss in the filter can be implemented on the basis of the description from line 17 on column 19 to line 43 on column 20 and FIGS. 8 and 9 of JP-B No. 2926040.

Next, other embodiment shown in FIG. 10 will be described. An inflator 310 shown in FIG. 10 has the same structure as the inflator 310 shown in FIG. 8 except for a location of a rupturable plate 319 and a method of charging a pressurized medium (the sealing pin 313 is provided).

In the inflator 310 shown in FIG. 8, the rupturable plate 319 is mounted to the opening portion 314 of the inflator housing 312, but in the inflator 310 shown in FIG. 10, the rupturable plate 319 is mounted to a rim of an opening 321 of the diffuser portion 320. The opening portion 314 of the inflator housing 312 and the opening 321 of the diffuser portion 320 may be arranged to abut each other. However, as shown in FIG. 10, it is desirable that they are arranged to obtain a clearance between the opening portion 314 and the rupturable plate 319. The size of the clearance can be adjusted by properly setting the length from the opening 321 to a tip end portion 323a of the diffuser housing 323 in the diffuser portion 320. In this case, joining by welding can be easily performed by abutting the tip end portion 323a against an expanded portion 315 of the inflator housing 312.

Next, the operation of the inflator 310 shown in FIGS. 8 to 10 will be described. At the time of being mounted to a vehicle, the inflator 310 is disposed, being included in a system comprising such as an activation signal-outputting means which comprises an impact sensor and a control unit, and a module case accommodating the above-described inflator 310 and a curtain air bag. The curtain air bag is connected at the opening portion 346 of the gas discharging port 340.

First, when the vehicle receives an impact, the igniter 326 is activated upon receiving the signal from the impact sensor of the system, and the priming is ignited and burnt so that the rupturable plate 319 is ruptured.

Since the opening portion 314 is opened due to the rupture of the rupturable plate 319, the pressurized medium in the inner space 316 flows out from the gas discharging hole 322 into the gas discharging port 340 via the communication hole 342, and further, it is discharged from the opening portion 346 via the filter 348 to inflate the curtain air bag.

In the series of operations, when the pressurized medium is discharged from the opening portion 346 of the gas discharging port 340, the flow direction of the pressurized medium is coincident with the direction of the center axis of the gas discharging port 340 so that the flow direction is coincident with the direction of the center axis of the inflator housing 312. Thereby, the curtain air bag connected to the opening portion 346 of the gas discharging port 340 inflates and develops in the same direction as the flow direction of the pressurized medium.

Furthermore, if fragments are made at rupture of the rupturable plate 319, the fragments are removed by the filter 348 so that they are prevented from being discharged into the curtain air bag.

Also, when a fire breaks out at a time of storage, transportation or the like before the air bag apparatus is mounted on a vehicle and then the igniter 326 is actuated erroneously and the rupturable plate 319 is ruptured, the pressurized medium flows out from the opening portion 346 of the gas discharging port 340, and consequently the curtain inflator 310 is ejected like a rocket utilizing the outflow of the pressurized medium as a thrust, which is very dangerous. However, if the adapter 350 is attached to the opening portion 346 of the gas discharging port 340, the pressurized medium flows from the plurality of ejecting holes 356 in the circumferential direction, a danger at the worst can be avoided.

Next, other embodiment shown in FIG. 11 will be explained. Common numerals in FIGS. 8 and 10 denote identical parts. Incidentally, the adapter 350 shown in FIG. 9 can be attached to the inflator 310 shown in FIG. 11.

In the inflator 310 shown in FIG. 11, a gas discharging port 340 is mounted on an extension of the central line of an opening portion 314 of an inflator housing 312. For this reason, after a rupturable plate 319 is ruptured at actuation, the pressurized medium flows out from an opening portion 346 of the gas discharging port 340 via the opening portion 314 of the inflator housing 312, an inner space 320a of the diffuser portion 320 and a gas discharging port 340 (flow path 349 of the pressurized medium) without changing the outflow direction of the pressurized medium.

An igniter 326 which is a rupturing means for the rupturable plate 319 provided in the diffuser portion 320 is arranged to face the inner space 320a of the diffuser portion 320 and such that the central axis of the igniter 326 is inclined to the central line of the rupturable plate 319 (coincident with the central line of the opening portion 314, the flow direction of the pressurized medium, the central axis of the inner space 320a of the diffuser portion 320, and the central axis of the gas discharging port 340). It is preferable that an angle ($\theta$) formed by the central axis of the igniter 326 and the central line of the rupturable plate is acute, more preferably, 10 to less than 90°, further preferably, 40 to 50°.

Next, the operation of the inflator 310 shown in FIG. 11 will be explained. When the vehicle received an impact, the igniter 326 is actuated upon receiving the signal form the, impact sensor, and the priming is ignited and burnt so that rupturable plate 319 is ruptured. At this time, since the igniter 326 and the rupturable plate 319 are arranged to have the angle $\theta$, the rupture can securely be performed.

Since the opening portion 314 opens by the rupture of the rupturable plate 319, the pressurized medium in the inner space 316 passes through the inner space 320a of the diffuser portion 320 and through the filter 348 and the flow path 349, and then flows out from the opening portion 346 to inflate the curtain air bag.

In this series of operations, the pressurized medium does not change the outflow direction thereof, so that the curtain air bag connected to the opening portion 346 of the gas discharging port 340 inflates and develops in the same direction as the outflow direction of the pressurized medium.

Next, other embodiment shown in FIG. 12 will be explained. Common numerals in FIGS. 8 and 10 denote identical parts. Incidentally, the adapter shown in FIG. 9 is also attached to the inflator 310 shown in FIG. 12.

In the inflator shown in FIG. 12, like the inflator 310 shown in FIG. 11, the gas discharging port 340 is mounted on an extension of the central line of the opening portion 314 of the inflator housing 312. For this reason, after a rupturable plate 319 is ruptured at actuation, the pressurized medium flows out from an opening portion 346 of the gas discharging port 340 via the opening portion 314 of the inflator housing 312, an inner space 320a of the diffuser portion 320 and a gas discharging port 340 (flow path 349 of the pressurized medium) without changing the outflow direction of the pressurized medium.

An igniter 326 which is a rupturing means for the rupturable plate 319 provided in the diffuser portion 320 is arranged facing the inner space 320a of the diffuser portion 320 and to cross perpendicularly to the central line of the rupturable plate 319.

The rupturable plate 319 is a cylindrical member disposed in the inner space 320a of the diffuser portion 320 and having one end closed and the other end open. And it closes the inner space 320a of the outflow path of the pressurized medium with a closed end 319a and a peripheral face 319b. Also, part of the peripheral face 319b faces oppositely an igniter 326 via an igniting hole 327. Here, the size ($d_1$) of the outer diameter of the cylindrical rupturable plate 319 and the size ($d_2$) of the inner diameter of the inner space 320a of the diffuser portion 320 are incident with each other or $d_1$ is slightly larger than $d_2$ ($d_1 > d_2$). By setting the sizes to $d_1 > d_2$, the opening portion 314 is securely closed and the outflow of the pressurized medium can be prevented from being discharged.

Furthermore, even when $d_1$ is smaller than $d_2$, a secure sealing can be achieved by welding and fixing a flange (an opening rim of the rupturable plate 319) of the rupturable plate 319) to the diffuser portion 320 abutting thereon. Naturally, when $d_1$ is larger than $d_2$, a welding can also be performed in the same manner. As a welding method, a laser welding, a resistance-welding, an electron beam welding or the like can be employed.

Next, the operation of the inflator 310 shown in FIG. 12 will be explained. When a vehicle receive an impact, the igniter 326 is activated upon receiving a signal from an impact sensor, and the priming is ignited and burnt so that a flame is ejected from the igniting hole 327 to rupture part of the peripheral surface 319b of the rupturable plate 319 facing oppositely the igniting hole 327. Due to the rupture, the rupturable plate 319 is deformed such that the closed end 319a laps towards the filter 348.

Since the opening portion 314 opens due to the rupture of the rupturable plate 319, the pressurized medium in the inner space 316 passes through the inner space 320a of the diffuser portion 320 and through the filter 348 and the flow path 349, and flows out from the opening portion 346 to inflate the curtain air bag.

In this series of operations, the pressurized medium does not change the outflow direction thereof, and the curtain air bag connected to the opening portion 346 of the gas discharging port 340 inflates and develops in the same direction as the outflow direction of the pressurized.

Figure 13:
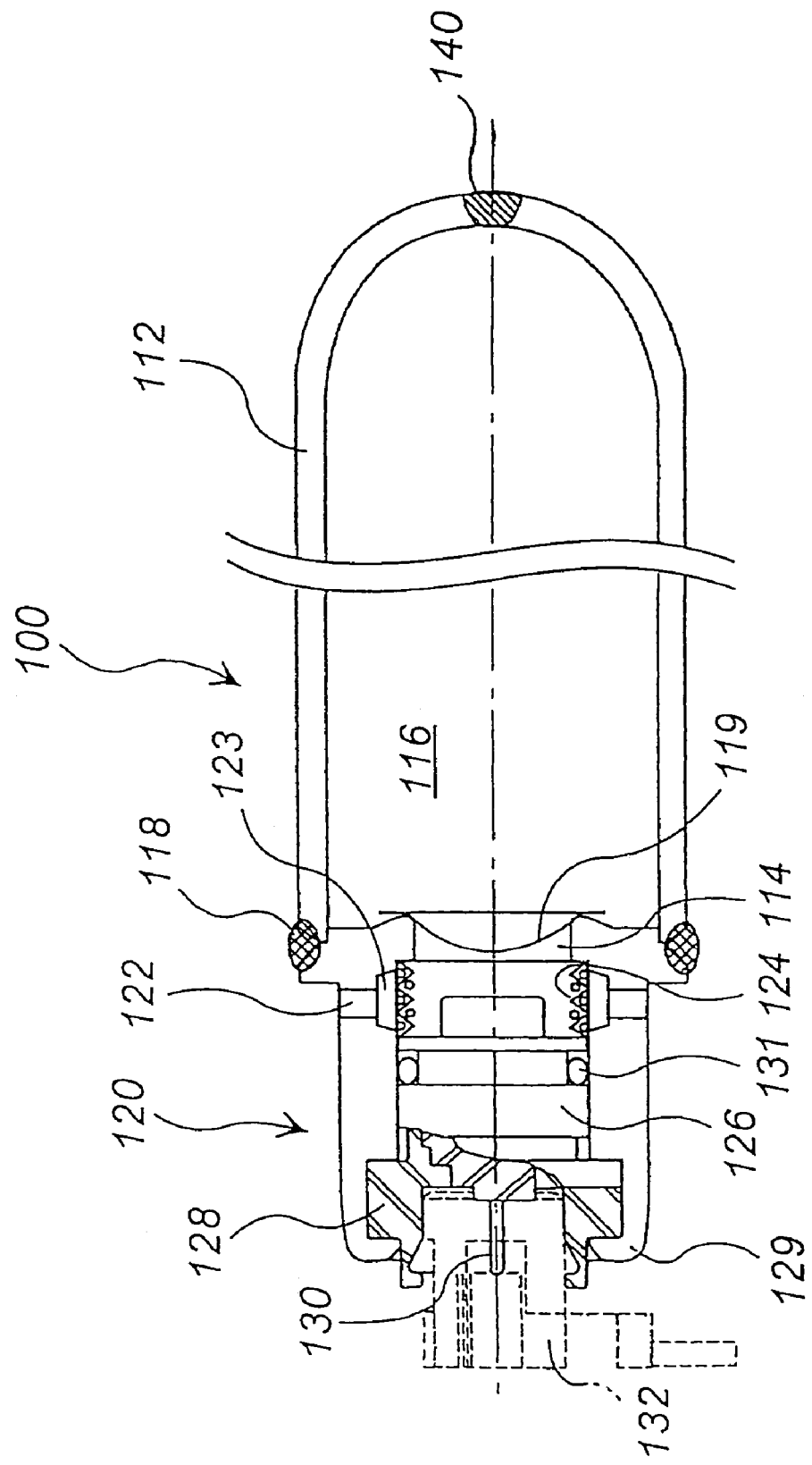
FIG. 13 is a sectional view of other embodiment of the inflator (II) of the present invention in the longitudinal direction.

Next, other embodiment shown in FIG. 13 will be explained. FIG. 13 is a sectional view of an inflator 100 of the present invention in the longitudinal direction.

An inflator housing 112 has an opening portion 114 at one end and the other end closed, and a pressurized medium comprising an inert gas is charged into the inner space 116 at the maximum pressure of 35,000 kPa. The inflator housing 112 in the widthwise direction has a circular section, and the opening portion 114 is circular similarly. The inflator housing 112 is manufactured by swaging method or the spinning method in the same manner as that shown in FIG. 8 and it is charged with the pressurized medium. Numeral 140 denotes a state where a thin hole is closed by a welding.

A diffuser portion 120 is fixed to the opening portion 114 of the inflator housing 112 at a joining portion 118 by a welding. The diffuser portion 120 has a plurality of gas discharging holes 122 for discharging the pressurized medium flowing from the opening portion 114 at actuation, and has an annular filter 124 made of a plain-stitched wire mesh or the like and arranged to cover the plurality of gas discharging holes 122 from the inside. An annular space 123 is provided between the plurality of gas discharging hole 122 and the annular filter 124, and the pressurized medium is discharged from the gas discharging hole 122 after passing through the annular filter 124 and the annular space 123. As illustrated, since the width of the annular filter 124 is made larger than the width of the annular space 123, and the sectional area in the radial direction of the annular space 123 is made larger than the total opening area of the gas discharging hole 122, so that the outflow amount of the pressurized medium is controlled by the gas discharging hole 122.

The opening portion 114 of the inflator housing 112 is closed with the rupturable plate 119, and, before actuation, the inner space 116 of the inflator housing 112 is maintained at a high pressure in a hermetic state. The gas discharging hole 122 is not closed, ventilating with the outside.

An igniter 126 including a priming is provided in the diffuser portion 120 as the rupturing means for the rupturable plate 119. The igniter 126 is fitted into a collar 128 and mounted to the diffuser portion 120, and it is fixed by crimping an end portion 129 of the diffuser portion 120. Numeral 130 denotes a conductive pin for electrifying the igniter 126, 131 denotes a O-ring, and 132 shown with a broken line denotes a connector for connection to a power supply at a time of mounting to a vehicle.

When the inflator 100 is activated, the pressurized medium flows from approximately the whole surface of the filter 124 to the annular space 123, and is discharged from the gas discharging hole 122. For this reason, since fragments of the rupturable plate 119 are captured on approximately the whole surface of the annular filter 124, the outflow amount of the pressurized medium is prevented from being decreased, and since the pressurized medium passes through the whole filter, a filter effect (filtering effect)is improved.

Figure 14:
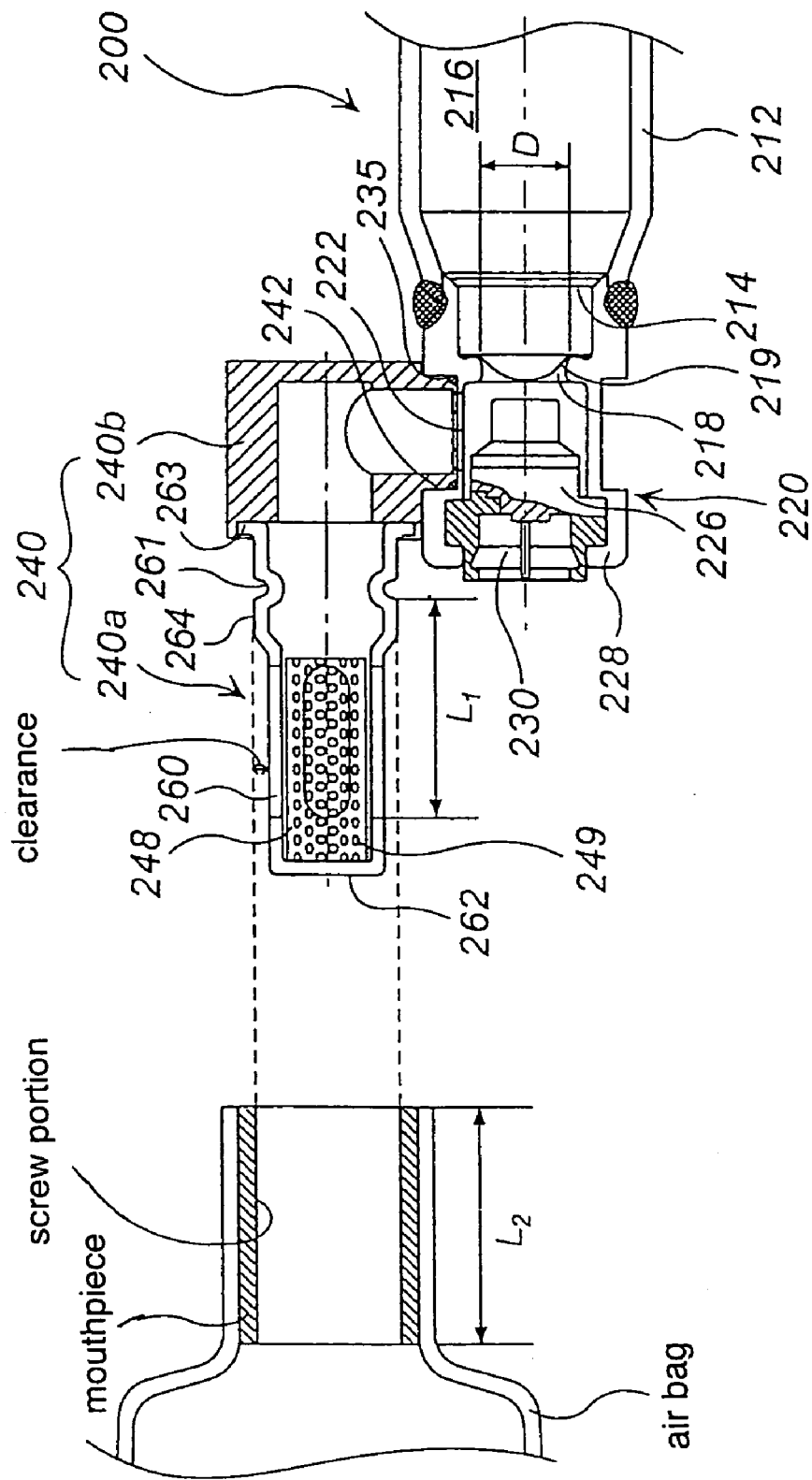
FIG. 14 is a sectional view of other embodiment of the inflator (II) of the present invention in the longitudinal direction.

Next, other embodiment shown in FIG. 14 will be explained. FIG. 14 is a partially sectional view of an inflator 200 of the present invention in the longitudinal direction.

An inflator housing 212 has an opening portion 214 at one end and the other end closed. A pressurized medium comprising an inert gas such as argon, helium or the like or a nitrogen gas is charged into an inner space 216 at the maximum pressure of about 70,000 kPa. The inflator housing 212 in the widthwise direction has a circular section, and the opening portion 14 is also circular. The inflator housing 212 is manufactured in the same manner as that in FIG. 8 and charged with the pressurized medium.

A diffuser portion 220 is connected to the opening portion 214 of the inflator housing 212, and the diffuser portion 220 has a first gas discharging hole 222 for discharging the pressurized medium outside. The inflator housing 212 and the diffuser portion 220 can be connected to each other by a welding or screwing.

The outflow path 218 of the pressurized medium between the opening portion 214 of the inflator housing 212 and the diffuser portion 220 is closed with a bowl-like rupturable plate 219, and, before actuation, the inner space 216 in the inflator housing 212 is maintained at a high pressure in a hermetic state. In FIG. 14, the rupturable plate 219 is attached to the diffuser portion 220, but it may be attached to the opening portion 214 of the inflator 212. The first gas discharging hole 222 of the diffuser portion 220 is not closed.

An igniter 226 having a priming is provided in the diffuser 220 as a rupturing means for the rupturable plate 219. The igniter 226 is mounted after the inflator housing 212 and the diffuser portion 220 are connected to each other. The igniter 226 is fitted from one end opening of the diffuser portion 220 towards the rupturable plate, and after fitted, it is fixed by crimping a peripheral edge 228 of the one end opening in the diffuser portion 220. Numeral 230 denotes a connector.

A gas discharging port 240 is connected to the diffuser portion 220, where the both are connected by press-fitting an inflow portion 242 of the gas discharging port 240 for the pressurized medium into the first gas discharging hole 222 of the diffuser portion 220. At this time, the diameter of the inflow portion 242 of the gas discharging port 240 is set to be slightly smaller than the diameter of the first gas discharging hole 222 of the diffuser portion 220.

The gas discharging port 240 comprises a main body portion 240a having one end closed (a closed end surface 262), the other end open and a flange portion 263, and an adapter portion 240b. These portions are connected to each other by engaging the flange portion 263 of the main body portion 240a with the inside of the adapter portion 240b, or crimping an end portion of the adapter 240b after fitting. Additionally, connection can be made by applying a resistance-welding. Incidentally, the gas discharging port 240 can have a structure such that the main body portion 240a and the adapter portion 240b are integrated with each other.

The adapter portion 240b and the diffuser portion 220 are connected to each other at a welded portion 235 by a resistance-welding. At this time, after the adapter portion 240b (inflow portion 242) and the diffuser portion 220 are resistance-welded, the main body portion 240a can be connected. Alternatively, after the main body portion 240a and the adapter portion 240b are connected to each other, the adapter portion 240b and the diffuser portion 220 can be resistance-welded.

A plurality of opening portions (a second gas discharging hole) 260 is provided in a side surface of the main body portion 240a, and a screen 248 having a plurality of outflow holes 249 through which allows the pressurized medium to pass for removing foreign objects is arranged in the inside thereof. A hole diameter of the outflow holes 249 can be selected from the numerical range of 0.5 to 2.0 mm.

At least two openings among the plurality of opening portions 260 are positioned symmetrical to each other or approximately symmetrical to each other in the widthwise direction. For example, six opening portions 260 are provided and they are arranged in the circumferential direction at equal intervals.

The screen 248 can comprise a cylindrical member formed of one layer or multiple layers of a punched metal, a plain-stitched wire mesh or a similar member, and the screen 248 is arranged such that the axial direction of the screen 248 and the axial direction of the gas discharging port 240 (the main body portion 240a) are coincident with each other. Outflow holes 249 are provided on the whole surface of the screen 248, but only outflow holes facing the opening portion 260 discharge the pressurized medium, functioning as a remover of foreign objects.

The screen 248 can be fixed, for example, by the following methods. After a cylindrical punched metal having substantially the same diameter as the inner diameter of the main body portion 240a is inserted and arranged inside the main body portion 240a, an embossing is performed from the outside of the outer surface of the main body portion 240a towards the inside thereof to provide convex portions at about three positions, so that the screen 248 can be supported and fixed. Also, the punched metal or the like is rolled tightly to form a cylinder having a diameter sufficiently smaller than the inner diameter of the main body portion 240a and it can be fixed by utilizing a function of the tightly rolled punched metal or the like which bulges in the radial direction to press the inner wall of the main body portion 240a.

A convex portion 264 and a groove portion (concave portion) 261 provided continuously in the circumferential direction or at intervals (desirably, continuously) are formed on the main body portion 240a in the adapter 240b side.

The convex portion 264 has a flat surface at top and a screw portion (a male screw portion or a female screw portion) can be provided, as required, and it is provided in the vicinity of the opening portion 260. The convex portion 264 is useful when the inflator 200 is connected to the air bag at the gas discharging port 240. The height of the convex portion 264 in the radial direction and the length thereof in the axial direction can be determined with reference to the connectivity (connection strength, workability or the like) with the air bag.

When the air bag apparatus is assembled, the groove portion 261 functions such that, after the main body portion 240a is covered with the air bag, the air bag can be fastened at the groove portion 261 so that the both can firmly be joined and the air bag can be prevented from falling off. The depth of the groove portion 261 in the radial direction can be determined with reference to the connectivity (connection strength, workability or the like) with the air bag.

In the inflator 200, the outflow amount of the pressurized medium can be controlled at a desired portion by adjusting the magnitude relationship among the diameter (opening area) of the outflow path 218 of the pressurized medium, the diameter (total opening area) of the first gas discharging hole 222, the diameter (total opening area) of the second gas discharging hole 260, the total opening area of the outflow hole 249 of the screen 248 or the like. For example, by minimizing the opening area of the outflow path 218 of the pressurized medium, the outflow amount of the pressurized medium can be controlled at the outflow path 218.

Next, with reference to FIG. 14, an aspect suitable for connecting the air bag and the inflator 200 to each other will be described.

A male screw portion is provided on the top surface of the convex portion 264 provided on the gas discharging port 240, and a mouthpiece having a female screw (has the same number of threads as that of the male screw portion) on the inner surface is attached to an opening of the air bag. The both are connected by screwing the male screw portion of the convex portion 264 into the female screw portion of the mouthpiece. Then, a distance $L_1$ from an end (an end nearer to the groove portion 261) of the convex portion 264 to an end (an end nearer to the closed end face 262) of the opening portion 260 and the length $L_2$ of the mouthpiece are set to be equal to each other. For this reason, when the air bag is mounted to the gas discharging port 240, a clearance (preferably, of 1 to 5 mm, more preferably, of 1.2 to 3 mm) serving as an outflow path of the pressurized medium is secured between the opening portion 260 and the inner surface of the mouthpiece, so that the inflation of the air bag can rapidly and securely be performed. Incidentally, as mentioned above, as long as the pressurized medium is ejected smoothly at the initial stage of actuation, the flow path of the pressurized medium thereafter is secured, so that $L_1 > L_2$ may be employed.

Figure 15:
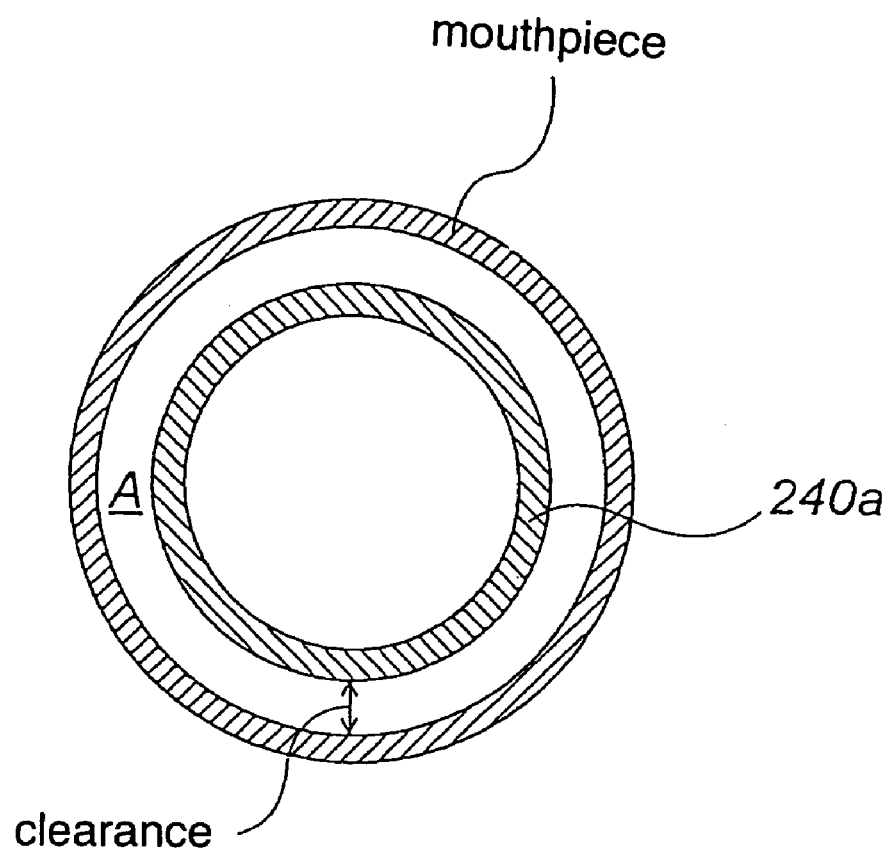
FIG. 15 is a schematically sectional view for explaining a connection state between the inflator shown in FIG. 14 and an air bag.

It is desirable that the sectional area of the clearance (an area shown as A in FIG. 15) defined by a difference between the sectional area of the mouthpiece in the widthwise direction and the sectional area, in the widthwise direction, in the insertion portion reaching the convex portion of the gas discharging port main body portion 240a is set to be larger than the total opening area of the outflow hole 249 of the screen 248 arranged at the gas discharging port 240 or the total opening area of the first gas discharging hole 222 arranged in the diffuser portion 220. By achieving such a relationship, the outflow amount of the pressurized medium can be controlled by the screen 248 or the first gas discharging hole 222. The opening area of the gas discharging hole 222 can be selected from the range of 15 to 30 mm$^2$, and the total opening area of the outflow hole 249 can be selected from the range of 30 to 60 mm$^2$.

In case that the inflator of the present invention is used as an inflator for a side collision, the gas discharging port becomes unnecessary and the air bag is connected to the gas discharging hole directly or via a suitable adapter.

PREFERRED EMBODIMENT OF THE INVENTION (III)

Figure 16:
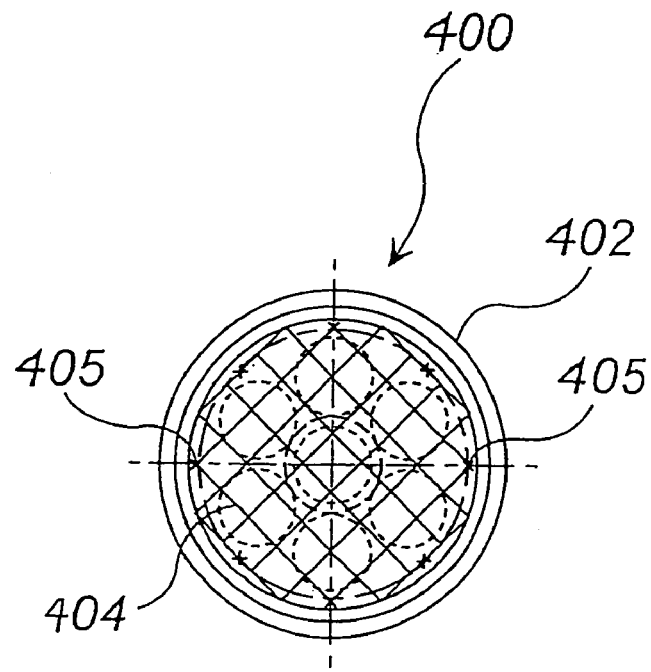
FIG. 16 is a plan view of a filter means of the present invention.
Figure 17:
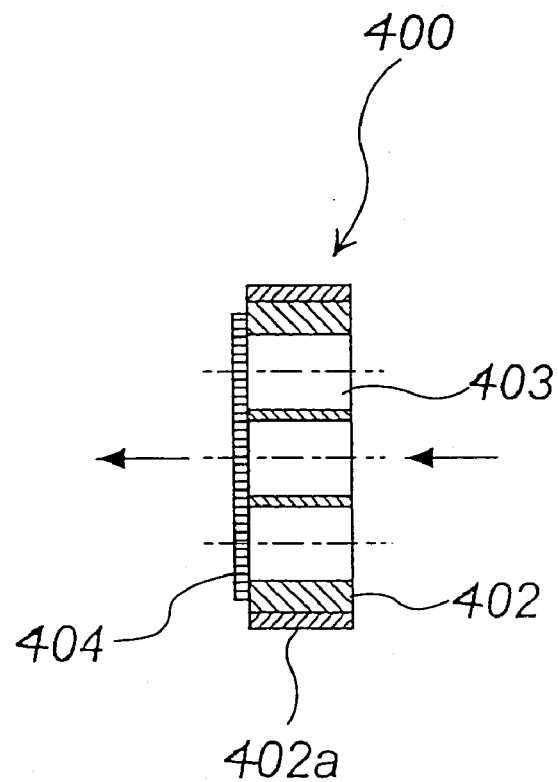
FIG. 17 is a sectional view of the filter means shown in FIG. 16 in the diametrical direction.
Figure 18:
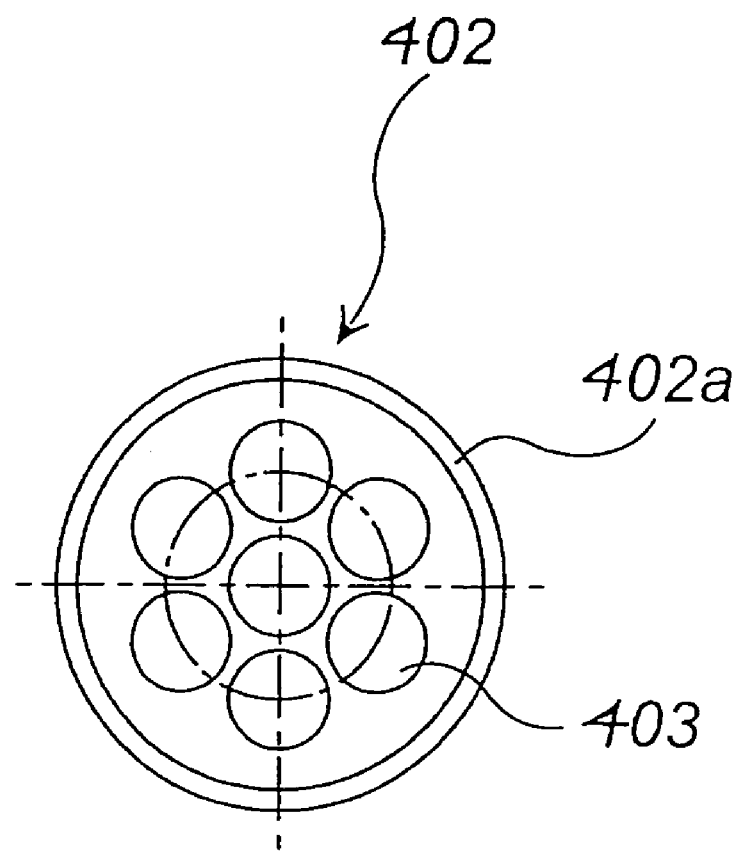
FIG. 18 is a plan view of a disk-shaped supporting body constituting the filter means shown in FIG. 16.

A filter means for an inflator (hereinafter, referred to as "a filter means") of the present invention will be explained with reference to the drawings. FIG. 16 is a plan view of a filter means, FIG. 17 is a sectional view of the filter means shown in FIG. 16 in the diametrical direction, and FIG. 18 is a plan view of a disk-shaped supporting body constituting the filter means.

A filter means 400 comprises a disk-shaped supporting body 402 and a filter member 404 covering one surface or both surfaces of the disk-shaped supporting body 402. The disk-shaped supporting body 402 has a required number (7 in the drawing) of through holes 403, and gas flows out through these through holes 403.

A screw portion 402a for mounting inside the inflator to be attached or removed optionally is provided on an outer peripheral surface of the disk-shaped supporting body 402, and the screw portion 402a is a male screw portion (or female screw portion) to be screwed in the inflator.

The filter member 404 comprises a punched metal or lath metal made of a metal such as stainless steel, and it is fixed to one surface of the disk-shaped supporting body 402 at a plurality of positions (shown as numeral 405 in drawing) by spot welding. The mesh of sieve of the filter member 404 can properly be set in the range developing a function as a filter for removing foreign objects, according to the inflator to be applied. In case of a mesh of sieve of a regular square, one side is preferably 0.4 to 2.0 mm, more preferably, 0.6 to 1.0 mm, further preferably 0.6 to 0.9 mm.

When both surfaces of the disk-shaped supporting body 402 are covered with the filter members 404, the meshes of sieve of the filter members can be set to be identical or they can be set to be different from each other.

If it is necessary to cool the pressurized medium during actuation, a cooling function can be given. For example, a method of making the disk-shaped supporting body 402 of a wire mesh member with a large specific surface area, a method of making the disk-shaped supporting body 402 of a material (aluminum, silver or the like) with a large heat conductivity, a method of combining the above two methods or the like can be employed for the filter means 400 having a cooling function.

Figure 19:
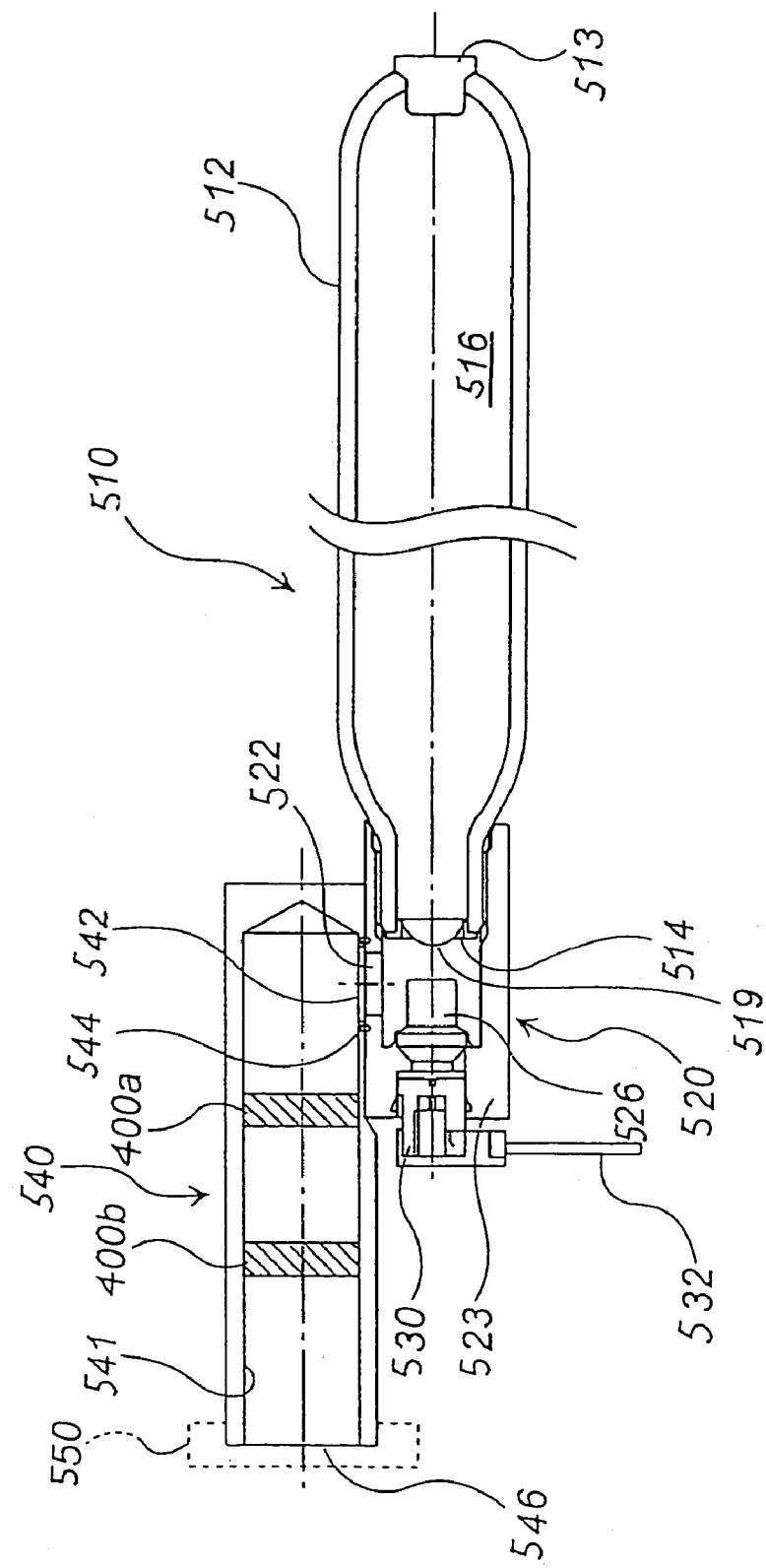
FIG. 19 is a sectional view of an inflator of the present invention in the longitudinal direction.

Next, the inflator in which the filter means 400 is disposed will be explained based on the drawings. FIG. 19 is a sectional view of an inflator 510 of the present invention in the longitudinal direction and a sectional view of an adapter 550 mounted to the inflator 510 of the present invention in the diametrical direction.

An inflator housing 512 has an opening 514 at one end and the other end closed. A pressurized medium comprising an inert gas such as argon, helium or the like or a nitrogen gas is charged into the inner space 516 at the maximum pressure of about 70,000 kPa. The inflator housing 512 in the widthwise direction has a circular section, and the opening 514 is also circular.

The inflator housing 512 may be formed by utilizing an existent gas cylinder, and it may be produced by swaging a pipe. After a diffuser portion 520 is connected to the inflator housing 512, a pressurized medium is charged via a clearance between a thin hole and a sealing pin 513 inserted therein and then the inflator housing 12 is welded at a portion of the sealing pin 513 to be closed completely.

The inflator housing 512 and the diffuser portion 520 may be connected by a welding or they may be connected by screwing a male screw portion provided on the periphery of the end portion in the inflator housing 512 into a female screw portion provided on the inner peripheral surface of the end portion in the diffuser portion 520.

The opening portion 514 of the inflator housing 512 is closed with a rupturable plate 519 in a bowl-like shape, and, before actuation of the inflator, the inner space 516 of the inflator housing 512 is maintained at a high pressure in a hermetic state. A gas discharging hole 522 of the diffuser portion 520 is not closed.

An igniter 526 having a priming is provided in the diffuser portion 520 as a rupturing means for the rupturable plate 519. The igniter 526 is fitted into the diffuser housing 523 to be mounted to the diffuser portion 520. Numeral 530 denotes a connector, and 532 denotes a lead wire for connecting to a power supply.

A gas discharging port 540 is connected to the diffuser portion 520, and they are connected at a welded portion 544 by welding after the gas discharging hole 522 of the diffuser portion 520 and a communication hole 542 of the gas discharging port 540 are met with each other. Also, the diffuser portion and the gas discharging port can be connected by fastening the both from the outside with a fastening means such as a metal band.

The gas discharging port 540 is mounted such that the central axis (shown in a dotted chain line in FIG. 16) of the inflator housing 512 and the central axis (shown in a dotted chain line in FIG. 16) of the gas discharging port 540 is parallel to each other. The gas discharging port 540 comprises a cylindrical member having one end closed and the other end formed with an opening portion 546, and an inner peripheral surface 541 is provided with a female screw portion (or a male screw portion).

Filter means 400a and 400b constituting the filter means 400 for removing foreign objects shown in FIGS. 16 and 17 are arranged in the gas discharging port 540. It is preferable, in view of weight reduction of whole the inflator, that the number of filter means to be disposed is one or two, but three or four or more filter means can be disposed.

Two filter means 400a and 400b are disposed at interval, but they may be disposed to contact with each other. The mesh of sieve of the filter means 400a is set to be larger than that of the filter means 400b, relatively large foreign objects are first removed by the filter means 400a and the relatively smaller remaining foreign objects are removed by the filter means 400b. Incidentally, if filter means 400 provided with the filter members 404 on both sides is used, the filter means is arranged such that the surface of the filter member 404 with a larger mesh of sieve is positioned in the gas discharging hole 522 side and the surface of the filter member 404 with a smaller mesh of sieve is positioned in the opening portion 546 side.

The filter means 400a and 400b can be made attachable/detachable by screwing the filter means in the gas discharging port 540 using a rod-like jig, and can be arranged movably at a desired position. As to the orientation of disposing the filter means 400, the filter means 400 is desirably disposed such that the pressurized medium flows out in the arrow direction in FIG. 17.

Figure 20:
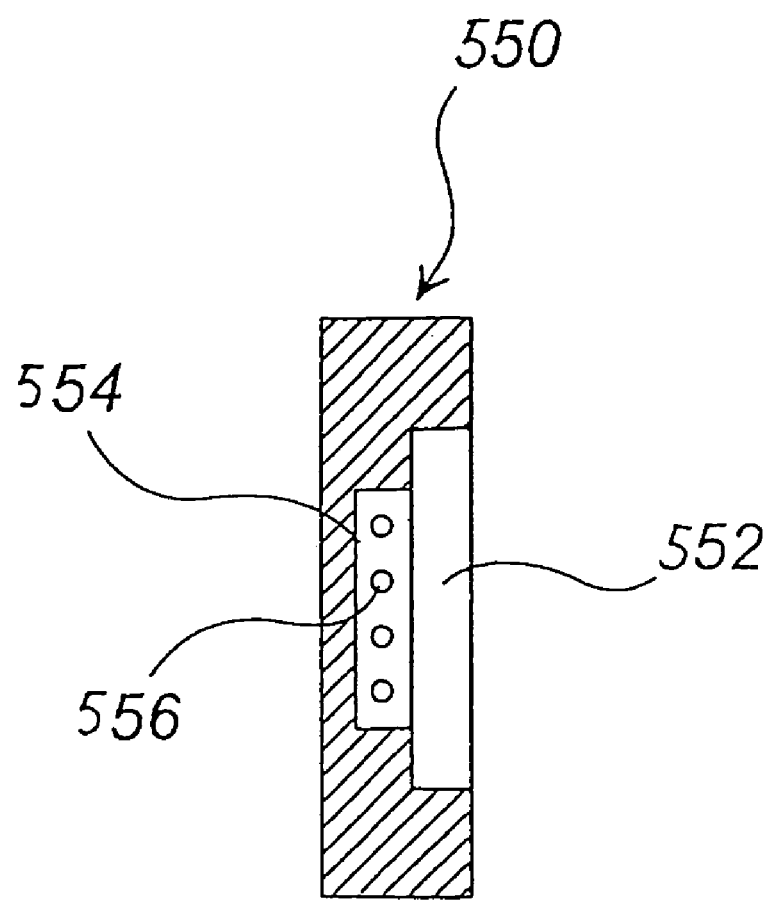
FIG. 20 is a sectional view of an adapter mounted, to the inflator of the present invention in the diametrical direction.

An adapter 550 can be mounted to the opening portion 546 of the gas discharging port 540 to be attached or removed optionally at storage and transportation. The adapter 550 is an annular plate member or a cylindrical member, as shown in FIG. 20, it has therein a concave portion 552 to receive an end portion of the opening portion in the gas discharging port 540 and another concave portion having a smaller diameter than that of the concave portion 552, and a plurality of ejecting holes 556 of through-holes piercing to an outer peripheral surface are provided in the concave portion 554. Incidentally, the adapter 550 can be made of an elastic member such as a rubber, plastics or the like in order to enhance an connecting with the gas discharging port 540, and an unillustrated fastening member such as a screw or the like can further be provided.

Next, the operation of the inflator 510 will be described. At the time of being mounted to a vehicle, the inflator 510 is disposed, being included in a system comprising such as an activation signal-outputting means which comprises an impact sensor and a control unit, and a module case accommodating the above-described inflator 510 and a curtain air bag. The curtain air bag is connected at the opening portion 546 of the gas discharging port 540.

First, when the vehicle receives an impact, the igniter 526 is activated upon receiving the signal from the impact sensor of the system, and the priming is ignited and burnt so that the rupturable plate 519 is ruptured. At this time fragments with different sizes can be made.

Since the opening portion 514 is opened due to the rupture of the rupturable plate 519, the pressurized medium in the inner space 516 flows out from the gas discharging hole 522 into the gas discharging port 540 via the communication hole 542, and further, it is discharged from the opening portion 546 via the filter members 400a and 400b to inflate the curtain air bag. At this time, relatively larger fragments are first removed by the filter means 400a with large meshes of sieve and then, relatively smaller fragments are removed by the filter means with small meshes of sieve. When the arrangement of the filter means 400a and 400b is reversed, the filter means 400a with small meshes of sieve tends to get clogged, and thereby a smooth outflow of the pressurized medium may be blocked.

In the series of operations, when the pressurized medium is discharged from the opening portion 546 of the gas discharging port 540, the flow direction of the pressurized medium is coincident with the direction of the center axis of the gas discharging port 540 so that the flow direction is coincident with the direction of the center axis of the inflator housing 512. Thereby, the curtain air bag connected to the opening portion 546 of the gas discharging port 540 inflates and develops in the same direction as the flow direction of the pressurized medium. Furthermore, if fragments are made at rupture of the rupturable plate 519, the fragments are removed by the filter means 400a and 400b so that they are prevented from being discharged into the curtain air bag.

Also, when a fire breaks out at a time of storage, transportation or the like before the air bag apparatus is mounted on a vehicle and then the igniter 526 is actuated erroneously and the rupturable plate 519 is ruptured, the pressurized medium flows out from the opening portion 546 of the gas discharging-port 540, and consequently the curtain inflator 510 is ejected Like a rocket utilizing the outflow of the pressurized medium as a thrust, which is very dangerous. However, if the adapter 550 is attached to the opening portion 546 of the gas discharging port 540, the pressurized medium flows from the plurality of ejecting holes 556 in the circumferential direction, a danger at the worst can be avoided.

Incidentally, if the inflator of the present invention is used as a inflator for a side collision, the gas discharging port 540 is unnecessary and the gas discharging hole 522 is connected with an air bag directly or via a proper adapter.

The invention claimed is:

1. An inflator, comprising:
   an inflator housing including therein a pressurized medium and provided with an opening portion, the inflator housing having an longitudinal axis;
   a diffuser including a gas discharging hole for discharging the pressurized medium and connected to the opening portion such that the inflator housing extends in a first direction along the longitudinal axis with respect to the diffuser;
   a rupturable plate closing an outflow path between the diffuser and the opening portion;
   an igniter provided in the diffuser and rupturing the rupturable plate, the igniter including therein a priming for generating a combustion product at actuation thereof; and
   a gas discharging port being a cylindrical tubular member and attached to the gas discharging hole, the gas discharging port being arranged to extend, with respect to the diffuser, in a second direction opposite to the first direction and parallel to the longitudinal axis,
   wherein said inflator satisfies at least one of the following requirements (a) to (d):
   (a) the igniter has a charge holder arranged to surround at least the priming from the outside and including an open end that opposes the rupturable plate;
   (b) the igniter has a cup arranged to include at least a priming therein and the cup has a fragile portion in a portion facing the rupturable plate:
   (c) an explosive is attached on the surface of the rupturable plate; and
   (d) the rupturable plate has a fragile portion.

2. The inflator according to claim 1, wherein the rupturable plate is mounted to the opening portion of the inflator housing or the diffuser portion.

3. The inflator according to claim 1, wherein the priming includes at least 280 mg of a main component containing a perchlorate compound.

4. An inflator according to claim 1, wherein the igniter is provided in the diffuser such that the igniter directly opposes the rupturable plate.

5. An inflator, comprising:
   an inflator housing including therein a pressurized medium and provided with an opening portion, the inflator housing including a center axis extending in a longitudinal axial direction thereof:

a diffuser including a gas discharging hole for discharging the pressurized medium and connected to the opening portion such that the inflator housing extends in a first direction along the center axis with respect to the diffuser;

a rupturable plate closing an outflow path for the pressurized medium between the diffuser and the opening portion;

an igniter provided in the diffuser and rupturing the rupturable plate, the igniter including therein a priming for generating a combustion product at actuation thereof; and a gas discharging port being a cylindrical tubular member and connected to the gas discharging hole for discharging the pressurized medium from the inflator housing, the gas discharging port being arranged to extend, with respect to the diffuser, in a second direction opposite to the first direction such that an axis of the gas discharging port is parallel to the center axis of the inflator housing.

6. The inflator according to claim 5, wherein the pressurized medium passes the opening portion and an inner space of the diffuser in a direction of the center axis without changing the outflow direction of the pressurized medium until the pressurized medium enters the gas discharging port.

7. The inflator according to claim 5, wherein the igniting means is provided in the diffuser such that an axis of the igniting means is arranged slantingly with respect to a center axis of the rupturable plate.

8. The inflator according to claim 7, wherein an angle formed between the center axis of the rupturable plate and the axis of the igniting means is an acute angle.

9. The inflator according to claim 7, wherein the rupturable plate includes a dome-shaped portion deformed to the outside of the inflator housing and the igniting means is provided such that end portion thereof accommodating the priming faces the dome-shaped portion.

10. The inflator according to claim 5, wherein the igniting means is provided such that a center axis of the rupturable plate is perpendicular to an axis of the igniting means.

11. The inflator according to claim 10, wherein the rupturable plate is formed in a cylindrical shape having one end closed and the other end open, and the rupturable plate is situated in the diffuser such that a circumferential wall thereof opposes the igniting means.

12. The inflator according to claim 5, wherein the igniting means is provided such that a center axis of the rupturable plate is perpendicular to an axis of the igniting means and wherein the rupturable plate is formed in a cylindrical shape having one end closed and the other end open, and the rupturable plate is situated in the diffuser such that a circumferential wall thereof opposes the igniting means, said inflator further comprising: a filter formed by a perforated member provided in the outflow path between the opening portion and an open end exit of the gas discharging port.

13. An inflator according to claim 5, further comprising:
a screen being cylindrical in shape and including a plurality of outflow holes formed in a circumferential surface thereof, and being provided within the gas discharging port.

14. An inflator according to claim 13, wherein the gas discharging port is provided with an opening portion formed in a circumference thereof, and the screen is provided within the gas discharging port such that the screen directly covers the opening portion.

15. An inflator according to claim 5, wherein the gas discharging port includes a plurality of opening portions that are arranged symmetrically or approximately symmetrically to one another in a widthwise direction thereof.

* * * * *